US012424755B2

(12) United States Patent
Kubwimana et al.

(10) Patent No.: US 12,424,755 B2
(45) Date of Patent: Sep. 23, 2025

(54) DUAL POLARIZED APERTURE FED STACKED PATCH ANTENNA

(71) Applicant: BAE SYSTEMS Information and Electronic Systems Integration Inc., Nashua, NH (US)

(72) Inventors: Jean L. Kubwimana, Merrimack, NH (US); Alexander D. Johnson, Waltham, MA (US); Jacob Tamasy, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 255 days.

(21) Appl. No.: 18/101,456

(22) Filed: Jan. 25, 2023

(65) Prior Publication Data

US 2024/0250431 A1 Jul. 25, 2024

(51) Int. Cl.

*H01Q 21/24* (2006.01)
*H01Q 1/48* (2006.01)
*H01Q 9/04* (2006.01)

(52) U.S. Cl.

CPC ............ *H01Q 9/0414* (2013.01); *H01Q 1/48* (2013.01); *H01Q 9/045* (2013.01); *H01Q 21/24* (2013.01)

(58) Field of Classification Search

CPC .... H01Q 9/0414; H01Q 9/045; H01Q 9/0407; H01Q 9/0457; H01Q 9/16; H01Q 1/48;

(Continued)

(56) References Cited

U.S. PATENT DOCUMENTS 5,043,738 A * 8/1991 Shapiro ................ H01Q 9/0457 343/700 MS
6,002,367 A * 12/1999 Engblom ............. H01Q 9/0421 343/702

(Continued)

FOREIGN PATENT DOCUMENTS

AU 2021103968 A4 4/2022
JP 6589815 B2 * 10/2019 ............. H01Q 13/08

OTHER PUBLICATIONS

E-Shaped Aperture Coupled Microstrip Patch Array Antenna NPL (Year: 2022).*

(Continued)

*Primary Examiner* — Dameon E Levi
*Assistant Examiner* — Gurbir Singh
(74) *Attorney, Agent, or Firm* — Gary McFaline

(57) ABSTRACT

An antenna assembly includes a ground plane having a first aperture slot and a second aperture slot. The first and second aperture slots are non-intersecting and substantially symmetrical with each other about an imaginary plane of symmetry that divides the ground plane into two substantially symmetrical halves, and that is orthogonal to the ground plane. The antenna assembly includes a first patch antenna above the ground plane, and a second patch antenna above the first patch antenna. The first patch antenna is separated from the ground plane, and the second patch antenna is separated from the first patch antenna. The imaginary plane also divides the first patch antenna into two substantially symmetrical halves, and divides the second patch antenna into two substantially symmetrical halves. A first feed line and a second feed line are at least in part below the first aperture slot and the second aperture slot, respectively.

17 Claims, 28 Drawing Sheets

(58) Field of Classification Search
CPC ........ H01Q 1/38; H01Q 13/106; H01Q 13/08; H01Q 21/065; H01Q 21/24
See application file for complete search history.

(56) References Cited

U.S. PATENT DOCUMENTS

| | | | | |
|---|---|---|---|---|
| 7,626,549 | B2 | 12/2009 | Channabasappa | |
| 2014/0361947 | A1 | 12/2014 | Haridas et al. | |
| 2018/0159213 | A1 | 6/2018 | Haziza | |
| 2022/0352635 | A1* | 11/2022 | Compton | H01Q 1/48 |
| 2022/0352636 | A1 | 11/2022 | Yetisir | |
| 2022/0368028 | A1* | 11/2022 | Govoni | H01Q 25/02 |

OTHER PUBLICATIONS

JP-6589815-B2 (Year: 2019).*
JP-6589815-B2 Translation (Year: 2019).*
Kajol Chandra Paul, and Anis Ahmed, E-shaped Aperture Coupled Microstrip Patch Array Antenna for High Speed Downlink Applications in Small Satellites, Jan. 2022, Intl Journal of Electronics and Telecommunications, 2022, vol. 68, No. 1, pp. 4756 (Year: 2022).*
International Search Report, PCT/US24/12515, mailed May 6, 2024, 16 pages.
Ding, et al., "An Optically Transparent Dual-Polarized Stacked Patch Antenna With Metal-Mesh Films," IEEE Antennas and Wireless Propagation Letters, vol. 18. No. 10. Oct. 2019. pp. 1981-1985.
Gao, et al., "Dual-Polarized Slot-Coupled Planar Antenna With wide Bandwidth," IEEE Transactions on Antennas and Propagation, vol. 51. No. 3, Mar. 2003. pp. 441-448.
Ghorbani, K. and Waterhouse, R.B., "Dual Polarized Wide-Band Aperture Stacked Patch Antennas," IEEE Transactions on Antennas and Propagation, vol. 52. No. 8, Aug. 2004. pp. 2171-2174.
Kim, et al., "A Dual-Polarization Aperture Coupled Stacked Microstrip Patch Antenna for Wideband Application," IEEE, 2010. 4 pages.
Lai, Hau-Wah and Luk, Kwai-Man, "Dual Polarized Patch Antenna Fed by Meandering Probes," IEEE Transactions on Antennas and Propagation, vol. 55. No. 9, Sep. 2007. pp. 2625-2627.
Mishra, et al., "A Review of Broadband Dual Linearly Polarized Microstrip Antenna Designs with High Isolation," IEEE Antennas and Propagation Magazine, vol. 56. No. 6, Dec. 2014. pp. 238-251.
Wincza, et al., "Octave-Band Aperture-Stakced Microstrip Antenna Element for Wideband Antenna Arrays," IEEE, 2016. pp. 1579-1580.
Padhi, et al., "A Dual Polarized Aperture Coupled Circular Patch Antenna Using a C-Shaped Coupling Slot," IEEE Transactions on Antennas and Propagation, vol. 51. No. 12, Dec. 2003, pp. 3295-3298.
Targonski, et al., "Design of Wide-Band Aperture-Stacked Patch Microstrip Antennas," IEEE Transactions on Antennas and Propagation, vol. 46. No. 9, Sep. 1998, pp. 1245-1251.
Rahim, et al., "Aperture Coupled Microstrip Antenna with Different Feed Sizes and Aperture Positions," IEEE, 2006 International RF and Microwave Conference Proceedings, Sep. 12-14, 2006. pp. 31-35.

* cited by examiner

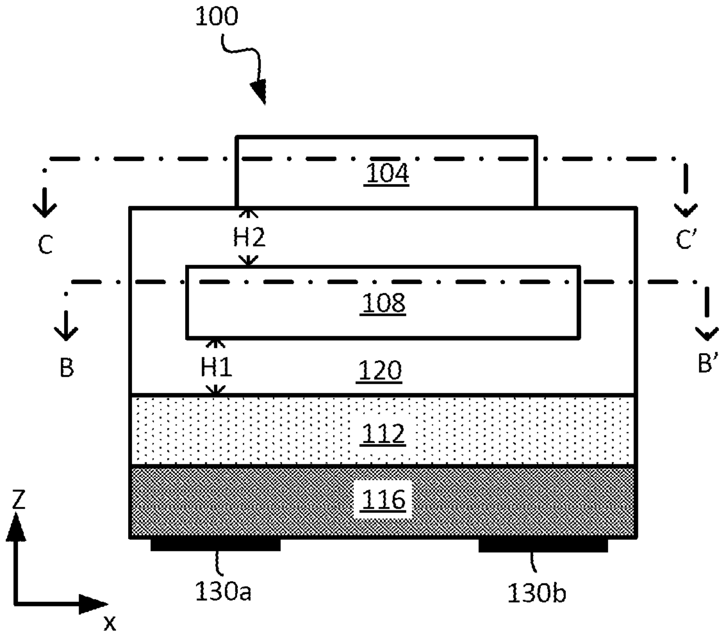
FIG. 1D
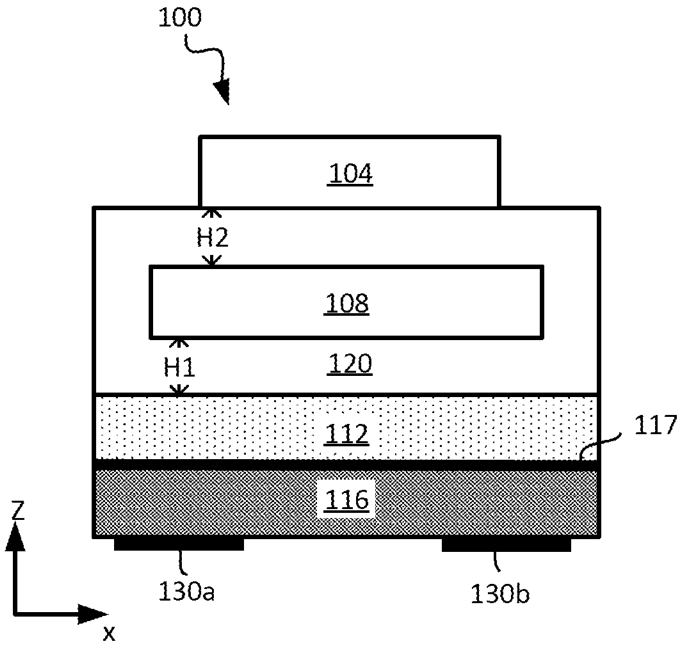
FIG. 1D1

DUAL POLARIZED APERTURE FED STACKED PATCH ANTENNA

FIELD OF DISCLOSURE

The present disclosure relates to antennas, and more particularly, to patch antenna structures.

BACKGROUND

A patch antenna is a type of low-profile antenna that can be mounted on a surface. It includes a sheet or "patch" of metal above a substrate that is deposited over a larger ground plane metal sheet. The metal patch provides a resonant transmission line, with its length corresponding to approximately one-half the wavelength of the resonant frequency. A patch antenna is often used at the radio frequency (RF) range, as such wavelengths are relatively short, which in turn allows the patches to be relatively small. There remain a number of non-trivial challenges with respect to designing and manufacturing patch antenna structures.

BRIEF DESCRIPTION OF THE DRAWINGS

FIGS. 1A, 1B, 1C, 1D, 1D1, and 1E illustrate various views of an aperture fed, electrically and mechanically symmetrical stacked patch antenna system (also referred to herein more simply as antenna system), in accordance with an embodiment of the present disclosure.

Figure 1A:
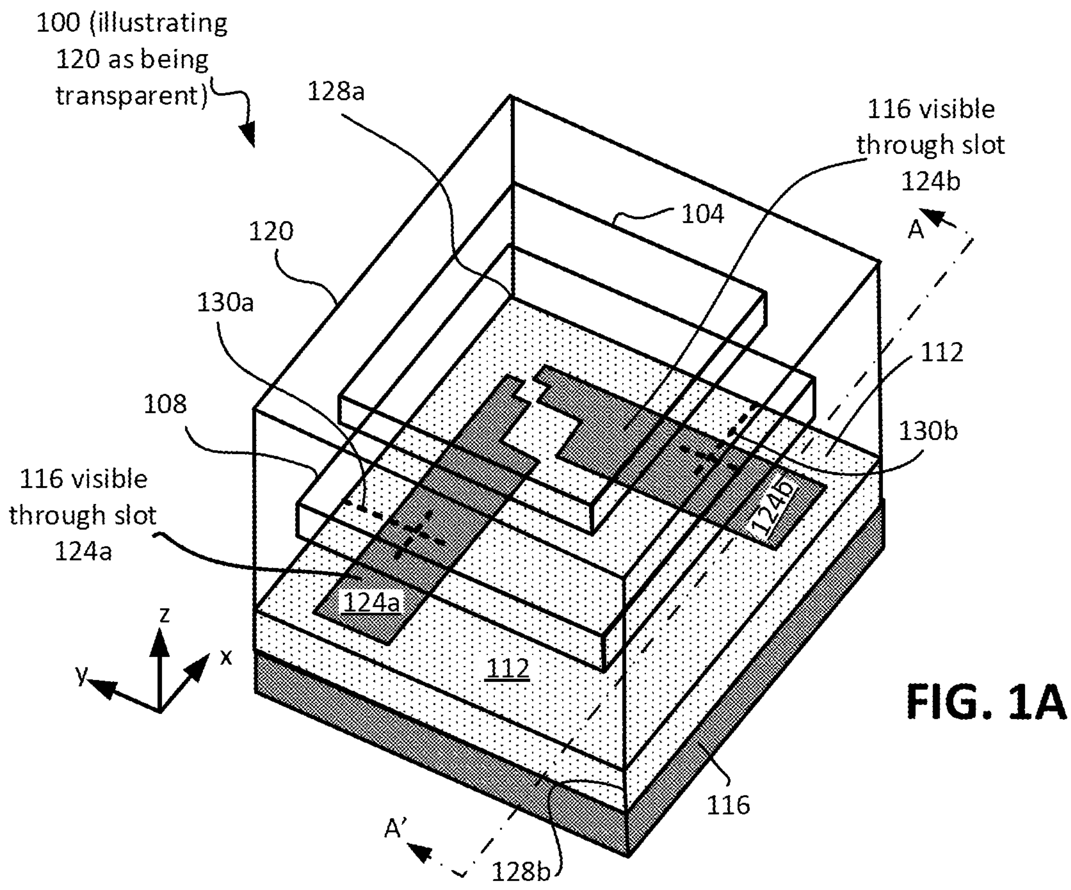

Although the following detailed description will proceed with reference being made to illustrative examples, many alternatives, modifications, and variations thereof will be apparent in light of this disclosure.

DETAILED DESCRIPTION

Patch antenna structures and arrays, along with forming methodologies, are disclosed. In accordance with an example, an antenna assembly includes a dual polarized, aperture fed, mechanically and electrically balanced or symmetrical, stacked patch antenna structure that has a wide bandwidth (e.g., with a bandwidth ratio of at least 2:1). In an example, the antenna assembly has a dimension that is equal to, or less than, 0.5λ in any direction (where λ is the resonant signal wavelength), and is linearly scalable in frequency range.

In some such examples, the stacked patch antenna structure includes at least two patch antennas comprising conductive material, such as a lower patch antenna above a conductive ground plane, and an upper patch antenna above the lower patch antenna. The radiating elements are separated from the ground plane, and from each other, by an appropriate dielectric material, such as dielectric foam material or another appropriate dielectric material. In an example, the ground plane comprises a first aperture slot and a second aperture slot that are non-intersecting with each other and substantially symmetrical with each other about an imaginary plane of symmetry that divides the ground plane into two substantially symmetrical halves, the imaginary plane being orthogonal to the ground plane. In an example, a first feed line is at least in part below the first aperture slot and a second feed line is at least in part below the second aperture slot. A layer of dielectric material (such as dielectric foam or a printed circuit board) separates the first and second feed lines from the ground plane. In an example, the antenna assembly may be arranged in an antenna array including many such assemblies, as will be discussed herein in further detail.

In some cases, at least a portion of the antenna assembly is additively manufactured, such as using a three-dimensional (3D) printing process. For example, initially, the ground plane with the aperture slots, the lower patch antenna, and the upper patch antenna are additively manufactured. In an example, the lower and upper patch antennas are supported above the ground plane using sacrificial support structures that extend between the ground plane and the lower and upper patch antennas. The ground plane, the lower and upper patch antennas, and the support structures are formed as a single, monolithic and continuous element, using the additive manufacturing process. In an example, this single element comprises conductive material, such as metal. In an example, a dielectric material, such as a dielectric foam, is provided between the ground plane and the lower and upper patch antennas (e.g., using an appropriate foaming process), such that the dielectric foam at least in part supports the lower and upper patch antennas above the ground plane. In one embodiment, with the dielectric foam in place, at least sections of the sacrificial support structures are removed (e.g., by machining or drilling away the sections of the support structures, or using one or more other appropriate processes discussed herein later), such that any remnant support structure may no longer physically (and electrically) couple the ground plane with any of the lower and upper patch antennas. Note that after removal of at least sections of the support structures, the dielectric foam now supports the lower and upper patch antennas above the ground plane. Subsequently, the ground plane (with the aperture slots formed therein, and with the upper and lower patch antennas and the dielectric foam disposed there above) is then attached to an upper surface of layer of dielectric material (such as a printed circuit board), where one or more feed lines are attached to a lower surface of the layer of dielectric material, thereby forming the antenna assembly.

It should be readily understood that the meaning of “above” and “over” in the present disclosure should be interpreted in the broadest manner such that “above” and “over” not only mean “directly on” something but also include the meaning of over something with an intermediate feature or a layer therebetween. As will be appreciated, the use of terms like “above,” “below,” “beneath,” “upper,” “lower,” “top,” and “bottom” are used to facilitate discussion and are not intended to implicate a rigid structure or fixed orientation; rather such terms merely indicate spatial relationships when the structure is in a given orientation.

General Overview

As mentioned herein above, there remain a number of non-trivial challenges with respect to designing and manufacturing patch antenna assemblies. For example, antenna arrays including patch antenna assemblies may be narrowband and have unsatisfactory bandwidth ratio (e.g., less than 2:1). In another example, aperture fed patch antennas can provide satisfactory bandwidth ratio, but such aperture fed patch antennas are limited to transmitting single polarization signals.

Accordingly, techniques are described herein to form dual polarized, aperture fed stacked antenna structures that have relatively high bandwidth and improved polarization diversity, and has mechanical and electrical symmetry. In an example embodiment, the antenna structure has a relatively wide bandwidth (e.g., with an octave bandwidth ratio, or a bandwidth ratio of at least 2:1). In some such examples, the antenna assembly has a dimension that is equal to, or less than, 0.5λ in any direction (where λ is the signal wavelength), and is linearly scalable in frequency range.

In one embodiment, the antenna structure comprises a conductive ground plane that has a first aperture slot and a second aperture slot (e.g., one for vertical polarization, and another for horizontal polarization). Thus, the antenna structure is a dual polarized antenna structure.

In one such example, the first aperture slot and the second aperture slot are non-intersecting and substantially symmetrical with each other about an imaginary plane of symmetry. The plane of symmetry divides the ground plane into two substantially symmetrical halves, where the imaginary plane is orthogonal to the ground plane.

Several example shapes of the first and second aperture slots are described herein below. In one example (e.g., see FIG. 2A), the first aperture slot has four sides facing four respective sides of the ground plane. In an example, a first side of the first aperture slot extending towards the plane of symmetry may be made relatively long (e.g., longer than the remaining sides of the first aperture slot), which facilitates in increasing the bandwidth ratio of the antenna structure. To achieve this objective, as will be described in further detail with respect to FIG. 2A, a second side of the first aperture slot (e.g., which faces the plane of symmetry) may be made non-linear (e.g., may include one or more step-like features) and/or not parallel to a corresponding second side of the ground plane. Note that due to the symmetry between the first and second aperture slots, the second aperture slot may have a substantial similar shape as the first aperture slot.

In some such examples, a lower patch antenna of the antenna structure is above the ground plane, and an upper patch antenna is above the lower patch antenna. The plane of symmetry also divides the lower patch antenna into two substantially symmetrical halves, and further divides the upper patch antenna into two substantially symmetrical halves. The ground plane, and the lower and upper patch antennas may comprise conductive material, such as one or more metals and/or alloys thereof.

In one embodiment, a dielectric material, such as a dielectric foam material or another appropriate dielectric material, is between the ground plane and the upper and lower patch antennas. For example, the dielectric material supports the upper and lower patch antennas above the ground plane.

The ground plane (with the aperture slots formed therein, and with the upper and lower patch antennas and the dielectric foam disposed there above) is then attached to an upper surface of a layer of dielectric material. In an example, the layer of dielectric material comprises a printed circuit board (PCB).

In one such embodiment, one or more feed lines are attached to a lower surface of the layer of dielectric material. For example, a first feed line is at least in part below the first aperture slot of the ground plane, and a second feed line is below the second aperture slot of the ground plane. In an example, the first feed line and the second feed line are non-intersecting and substantially symmetrical with each other about the plane of symmetry.

In some cases, the antenna structure can be arranged in an array. In some such embodiments, in the antenna array, a single and monolithic ground plane is used for a plurality (such as all) of the antenna structures within the array.

For example, the antenna array comprises (i) a first lower patch antenna above the ground plane, and a first upper patch antenna above the first lower patch antenna, where the first lower and first upper patch antennas are of a first antenna structure, and (ii) a second lower patch antenna above the ground plane, and a second upper patch antenna above the first lower patch antenna, where the second lower and second upper patch antennas are of a second antenna structure. Thus, the ground plane is common to both the first and second antenna structures. Similarly, the ground plane has two corresponding aperture slots of the first antenna structure below the first lower patch antenna, and two other corresponding aperture slots of the second antenna structure below the second lower patch antenna. Similarly, two feed lines are at least in part respectively below the two corresponding aperture slots of the first antenna structure, and two other feed lines are at least in part respectively below the two corresponding aperture slots of the second antenna structure. Thus, in this example, the first and second antenna structures are formed laterally adjacent to one another, and the antenna array comprises several such laterally adjacent antenna structure pairs.

As described, the ground plane can be common to multiple the antenna structures of the antenna array, and similarly, the dielectric material comprising dielectric foam can also be common to the multiple antenna structures of the antenna array. Thus, a monolithic and continuous dielectric foam material separates the monolithic and continuous ground plane from the plurality of upper patch antennas and the plurality of lower patch antennas of the plurality of antenna structures of the antenna array.

In some examples, at least a portion of the antenna array is additively manufactured, such as using a 3D printing process. For example, initially, the ground plane with the plurality aperture slots, the plurality of lower patch antennas, and the plurality of upper patch antennas of the antenna array are additively manufactured. In one such example, each lower patch antenna and each upper patch antenna are supported above the ground plane using sacrificial support structures that extend between the ground plane and corresponding lower and upper patch antennas. The ground plane, the plurality of lower patch antennas, the plurality of upper patch antennas, and the support structures of the antenna array are manufactured as a single, monolithic and continuous element. In an example, this single element comprises conductive material, such as metal.

In an example, a dielectric material, such as a dielectric foam, is provided between the ground plane and the plurality of lower and upper patch antennas, e.g., using an appropriate foaming process. Thus, the dielectric foam at least in part supports the lower and upper patch antennas above the ground plane.

In one embodiment, with the dielectric foam supporting the patch antennas, at least sections of the sacrificial support structures are removed, e.g., by machining or drilling away the sections of the support structures, or using one or more other appropriate processes discussed herein later. Any remnant support structure may no longer physically (and electrically) couple the ground plane with any of the lower and upper patch antennas. Note that after removal of at least sections of the support structures, the dielectric foam supports the lower and upper patch antennas above the ground plane.

Subsequently, the ground plane (with the aperture slots therewithin, and with the upper and lower patch antennas and the dielectric foam thereon), is then attached to an upper surface of layer of dielectric material (such as a PCB), where the plurality of feed lines of the antenna array are attached to a lower surface of the layer of dielectric material, thereby forming the antenna array described herein.

In an example, because the ground plane (e.g., including the aperture slots) and the upper and lower patch antennas comprising conductive material (such as metal) are formed using the additive manufacturing process and because the antenna assembly can be modularly expanded to an antenna array, the antenna assembly is referred to herein as all metal modular array (AMMA) in an example, and also referred to herein as additively manufactured modular aperture (AMMA) in another example. Numerous configurations and variations will be apparent in light of this disclosure.

Materials that are "compositionally different" or "compositionally distinct" as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper).

The phrase "substantially" has been used throughout this disclosure. In an example, length A is substantially equal to length B implies that A and B are within 5% or within 3% or within 2% or within 1% of each other. In another example, length A is substantially equal to length B implies that A and B are within 0.1λ or within 0.05λ or within 0.01λ of each other. In an example, angle P is substantially equal to angle Q implies that P and Q are within 5 degrees, or 3 degrees, or 2 degrees, or 1 degree of each other. A first line (or a first side of a feature) being substantially parallel to a second line (or a second side of a feature) implies that an angle between the two lines (or two sides) is at most 5 degrees, or at most 4 degrees, or at most 3 degrees, or at most 2 degrees, or at most 1 degree, for example. A first feature is substantially symmetrical to a second feature implies that various dimensions of the first feature and corresponding dimensions of the second feature are substantially the same (e.g., within 5% or within 3% or within 2% or within 1% of each other), and locations of the two features with respect to a plane of symmetry (such as a plane of symmetry 212 discussed herein below) are substantially the same (e.g., within 5% or within 3% or within 2% or within 1% of each other).

It should be readily understood that the meaning of "above" and "over" in the present disclosure should be interpreted in the broadest manner such that "above" and "over" not only mean "directly on" something but also include the meaning of over something with an intermediate feature or a layer therebetween. As will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

Architecture

FIGS. 1A, 1B, 1C, 1D, 1D1, and 1E illustrate various views of an aperture fed, electrically and mechanically symmetrical stacked patch antenna system 100 (also referred to herein as antenna system 100 or simple as system 100), in accordance with an embodiment of the present disclosure.

Figure 1B:
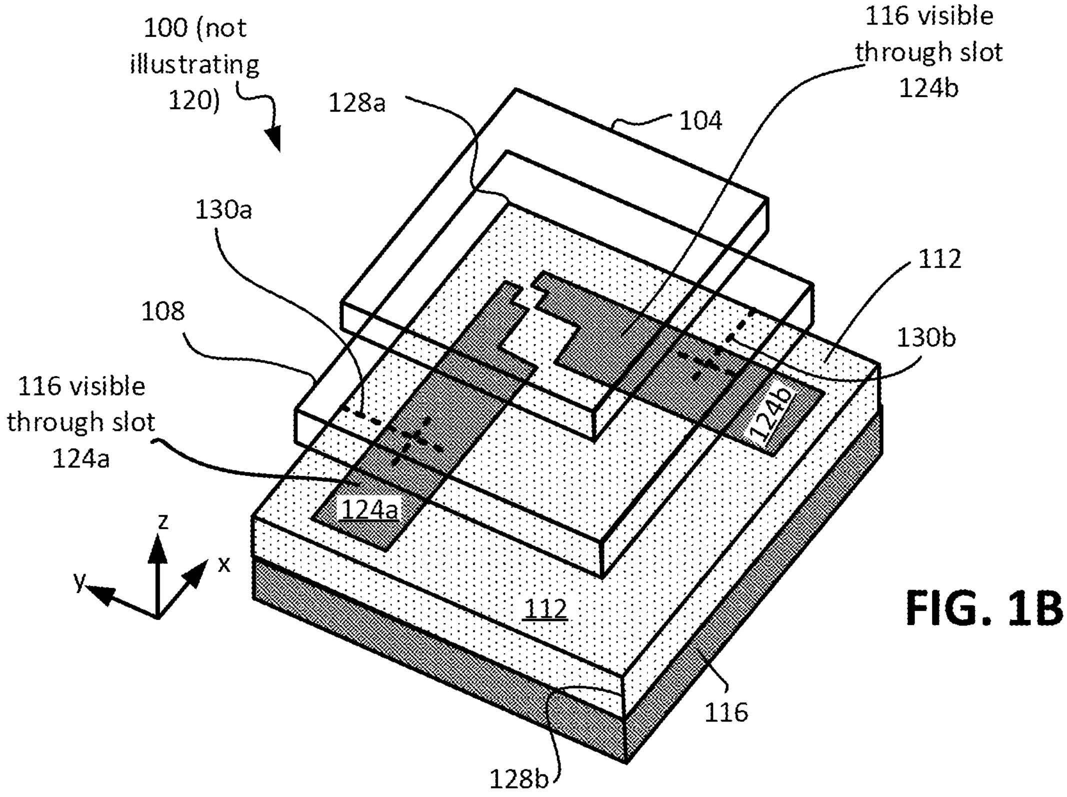
Figure 1C:
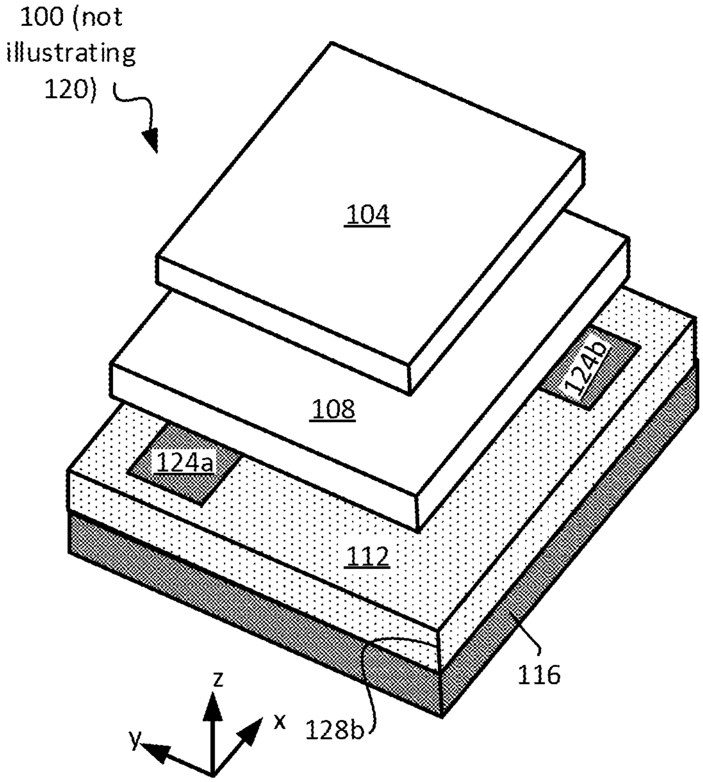
Figure 1E:
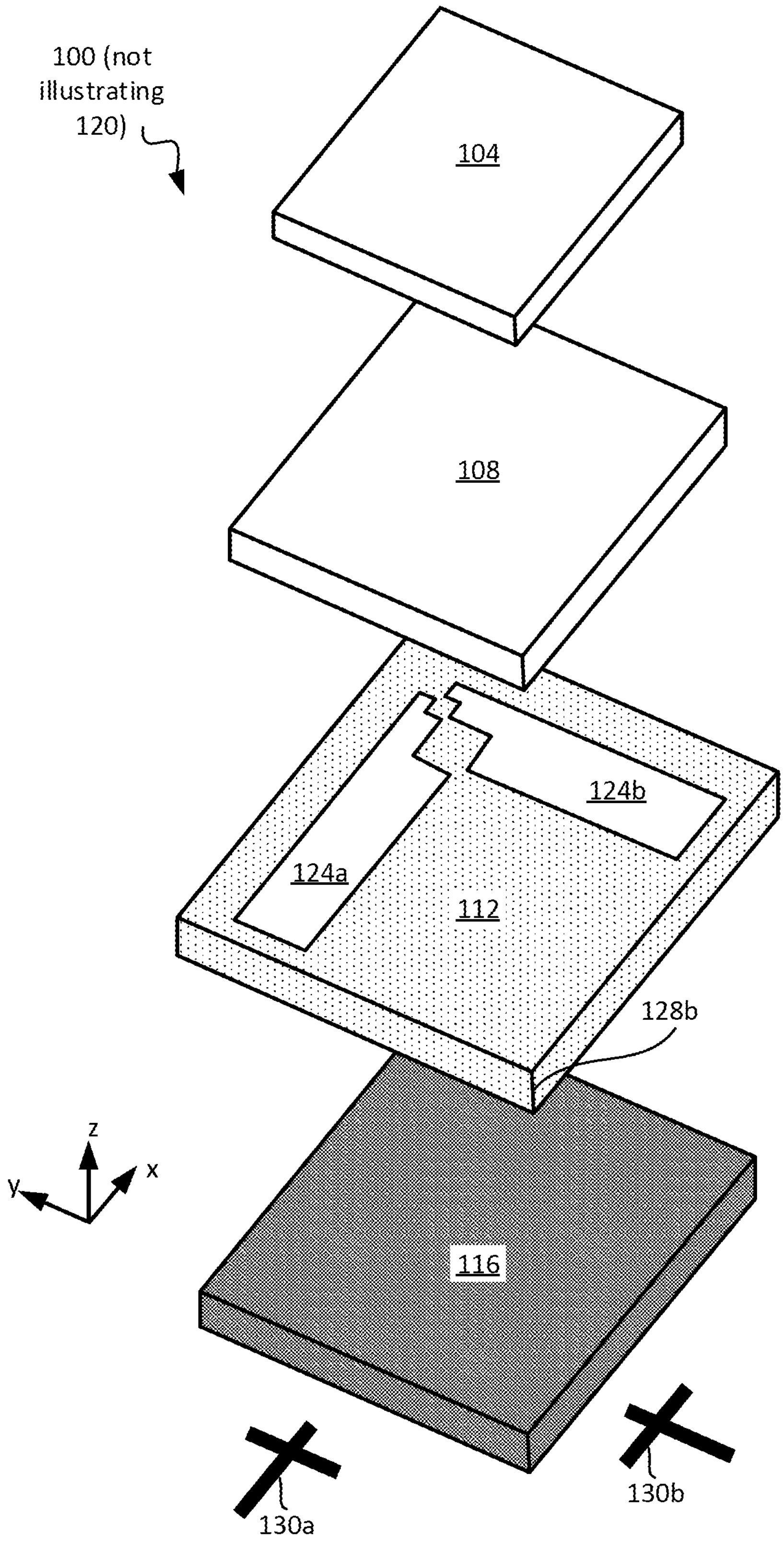

Specifically, FIG. 1A illustrates a perspective view of the system 100. Note that some of the components of the system 100, such as patch antennas 104, 108 and dielectric material 120 in FIG. 1A are illustrated as being transparent (although they may not be transparent in practical implementations), to better illustrate other components that are at least in part covered by these components. Also note that feed lines 130*a* and 130*b* would not be visible in the perspective view of FIG. 1A, as the feed lines 130*a* and 130*b* would be covered by other components (such as ground plane 112 and dielectric material 116), and hence, the feed lines 130*a* and 130*b* are illustrated using dotted lines in FIG. 1A. FIG. 1B illustrates a perspective view of the system 100 similar to FIG. 1A, but without the dielectric material 120. FIG. 1C illustrates a perspective view of the system 100 similar to FIG. 1B, but now with the patch antennas 104, 108 being illustrated as being opaque (as discussed above, the patch antennas 104, 108 were illustrated as being transparent in FIGS. 1A, 1B). Furthermore, the feed lines 130*a* and 130*b* are not illustrated in FIG. 1C, as these would be below and covered by the ground plane 112 and the dielectric material 116. Similarly, parts of the aperture slots 124*a*, 124*b* are not visible in FIG. 1C, for being covered by the opaque patch antennas 104 and 108. FIGS. 1D and 1D1 illustrate cross-sectional views of the system 100, when viewed along a line A-A' of FIG. 1A. FIG. 1E illustrates an exploded perspective view of the system 100, without the dielectric material 120.

Referring to FIGS. 1A, 1B, 1C, 1D, 1D1, and 1E (generally referred to herein as FIGS. 1A-1E), the system 100 comprises a conductive ground plane 112. For example, the ground plane 112 comprises material is at least partially electrically conductive (e.g., it is all metal or at least partially metal). In some other examples, the material of the ground plane 112 is at least partially non-conductive and at least partially plated with another conductive material (e.g., a metal plating). In an example, the ground plane 112 comprises an appropriate metal such as copper or another appropriate metal, or an alloy thereof.

Figure 2A:
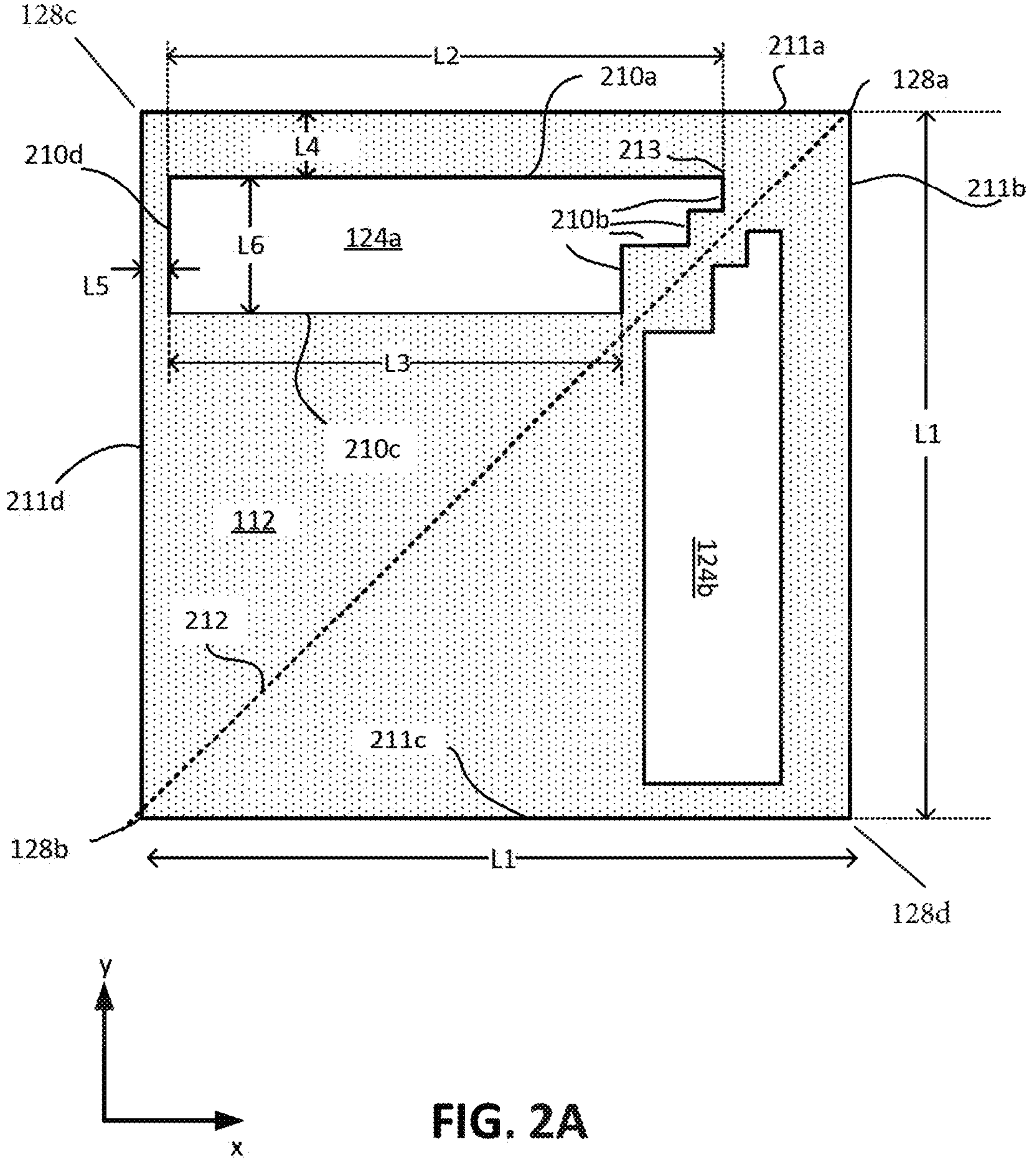
FIG. 2A illustrates a plan view of a ground plane of the antenna system of FIGS. 1A-1E, and further illustrates two aperture slots within the ground plane, in accordance with an embodiment of the present disclosure.

In one embodiment, the ground plane 112 includes at least a first aperture slot 124*a* and a second aperture slot 124*b*. The slots 124*a*, 124*b* are visible in FIGS. 1A, 1B, and 1E, partially visible in FIG. 1C, and not visible in the cross-sectional views of FIG. 1D, 1D1. FIG. 2A illustrates a plan view of the ground plane 112 of the antenna system 100 of FIGS. 1A-1E, and further illustrates two aperture slots 124*a*, 124*b* within the ground plane 112, in accordance with an embodiment of the present disclosure. Note that FIG. 2A also illustrates an imaginary plane 212 extending through two corners 128*a* and 128*b* of the ground plane 112 as well as third and fourth corners 128*c* and 128*d*, respectively.

Referring to FIGS. 1A, 1B, 1E, and 2A, the aperture slots 124*a*, 124*b* (also referred to herein as slots 124*a*, 124*b*) are cut into the ground plane 112. Thus, a slot 124 is a hole or an opening that extends through the ground plane 112. Note that inner sidewalls of individual slots are not illustrated the perspective views of various figures, for purposes of illustrative clarity.

In a plan view (or a perspective view), the dielectric material 116, which is below the ground plane 112, would be visible through the slots 124*a*, 124*b* within the ground plane 112. For example, in FIGS. 1A-1C, the dielectric material 116 is visible through the slots 124*a*, 124*b*. Note that the dielectric material 116 is not shown through the slots 124*a*, 124*b* in FIG. 2A, as this figure illustrates merely the ground plane 112 and the slots 124*a*, 124*b* within the ground plane 112, without the dielectric material 116 being below the ground plane 112. For similar reasons, in the exploded view of FIG. 1E, the dielectric material 116 is not visible through the slots 124*a*, 124*b*.

In an example, the slots 124*a* and 124*b* respectively couple the feed lines 130*a*, 130*b* (which are below the dielectric material 116) to the patch antennas 104, 108, and cause to excite the patch antennas 104, 108, thereby causing transmission of RF signals by the antenna system 100. Thus, the antenna system 100 is an aperture fed antenna system.

As discussed, FIG. 2A illustrates the imaginary plane of 212 that passes through two corners 128*a* and 128*b* of the ground plane 112. Note that the corners 128*a*, 128*b* are visible and labelled in FIGS. 1A and 1B, while only the corner 128*b* is visible in FIGS. 1C and 1E (the opaque patch antennas 104, 108 cover the corner 128*a* in FIGS. 1C and 1E). In one embodiment, the imaginary plane 212 is orthogonal to the ground plane 212. The plan view of FIG. 2A illustrates a 2D representation of the imaginary plane 212, e.g., a line of intersection of the imaginary plane 212 with the ground plane 112. Thus, the ground plane has an outer perimeter defined by four corners, and the plane 212 passes through two opposing corners 128*a* and 128*b*.

The plane 212 is also referred to herein as a plane of symmetry 212, as one or more components of the system 100 is symmetrical along the plane 212. For example, the ground plane 112 has a square shape, and the plane of symmetry 212 divides the ground plane in substantially symmetrical halves. In another example, the ground plane 112 may have another appropriate shape, such as a circle or a rhombus, such that the plane of symmetry 212 can divide the ground plane 112 in substantially symmetrical halves.

Similarly, in an example, the aperture slots 124*a*, 124*b* are substantially symmetrical along the plane of symmetry 212. Thus, the aperture slots 124*a*, 124*b* have the same shape, and a mirror image of each other along the plane of symmetry 212.

Referring to FIG. 2A, the ground plane has four sides or edges 211*a*, 211*b*, 211*c*, 211*d*, where sides 211*a* and 211*c* are opposing sides, and sides 211*b* and 211*d* are opposing sides. In one embodiment, individual sides of the ground plane 212 has a dimension of L1 (e.g., the ground plane 112 is a square), where in an example L1 is equal to substantially 0.5λ or less, where λ is a wavelength of a signal transmitted by the system 100. For example, if the frequency of the signal is 6 GHZ, then λ is 5 cm or about 2 inches, and an upper and lower surface of the square shaped ground plane 112 has a dimension of 1×1 inches, or about 1 inch for each side 211*a*, . . . , 211*d*. In another example, L1 is less than 0.5λ, such as at most 0.49λ, 0.48λ, 0.45λ, or 0.40λ, for example.

The phrase "substantially" has been used throughout this disclosure. In an example, length A is substantially equal to length B implies that A and B are within 5% or within 3% or within 2% or within 1% of each other. In another example, length A is substantially equal to length B implies that A and B are within 0.1λ or within 0.05λ or within 0.01λ of each other. In an example, angle P is substantially equal to angle Q implies that P and Q are within 5 degrees, or 3 degrees, or 2 degrees, or 1 degree of each other. A first line (or a first side of a feature) being substantially parallel to a second line (or a second side of a feature) implies that an angle between the two lines (or two sides) is at most 5 degrees, or at most 4 degrees, or at most 3 degrees, or at most 2 degrees, or at most 1 degree, for example. A first feature is substantially symmetrical to a second feature implies that various dimensions of the first feature and corresponding dimensions of the second feature are substantially the same (e.g., within 5% or within 3% or within 2% or within 1% of each other), and locations of the two features with respect to a plane of symmetry (such as the plane of symmetry 212) are substantially the same (e.g., within 5% or within 3% or within 2% or within 1% of each other).

Referring again to FIG. 2A, the slot 124*a* is discussed herein below in further detail, and because the slots 124*a* and 124*b* are substantially symmetrical, such discussion with respect to slot 124*a* is also applicable to the slot 124*b* due to their symmetry. The slot 124*a* of the ground plane 112 has four sides or edges 210*a*, 210*b*, 210*c*, 210*d*, where sides 210*a* and 210*c* are opposing sides, and sides 210*b* and 210*d* are opposing sides. The sides 210*a* and 210*b* meet at an internal corner 213 of the ground plane 212, and this internal corner 213 is nearest to the corner 128*a* that any other corner of the ground plane 112, where the plane 212 passes through the corner 128*a*.

The side 210*a* of the slot 124*a* faces the side 211*a* of the ground plane 112, the side 210*b* of the slot 124*a* faces the side 211*b* of the ground plane 112, the side 210*c* of the slot 124*a* faces the side 211*c* of the ground plane 112, and side 210*d* of the slot 124*a* faces the side 211*d* of the ground plane 112. In an example, the side 210*a* is longer than the side 210*c*. For example, it may be desirable (e.g., in order to increase a bandwidth ratio of the system 100) to increase a length of the side 210*a* of the slot 124*a*, without the slot 124*a* touching the slot 124*b*. Thus, in an example, the side 210*a* is made as long as possible, without the slot 124*a* touching the slot 124*b*. In an example, the length of the side 210*a* is L2, which may be within a range of 0.35 to 0.41λ for example, e.g., substantially equal to 0.38λ.

In one embodiment, the side 210*c* of the slot 124*a* is shorter than the side 210*a*, as illustrated. For example, to make the side 210*a* as long as possible and to ensure that the two slots 124*a*, 124*b* remain non-intersecting (e.g., the two slots 124*a*, 124*b* doesn't touch each other), the side 210 extends towards the side 211*b* of the ground plane 112, without the side 210*c* correspondingly extending towards the side 211*b* of the ground plane 112, thereby making the side 210*c* shorter than the side 210*a*. For example, the side 210*c* of the slot 124*a* has a length of L3, which may be within a range of 0.29λ to 0.35λ for example, e.g., substantially equal to 0.32λ. In one embodiment, the length L3 of the side 210*c* is at least 0.12λ, or at least 0.08λ, or at least 0.06λ, or at least 0.04λ, or at least 0.02λ, or at least 0.01λ shorter than the length L2 of the side 210*a*.

In one embodiment, the side 210*a* is substantially parallel to the side 211*a* of the ground plane 112, and the two sides 210*a* and 211*a* are at a distance of L4 (illustrated in FIG. 2A). Distance L4 is in a range of 0.1λ to 0.16λ for example, e.g., substantially equal to 0.13λ.

In one embodiment, the side 210*d* is substantially parallel to the side 211*d* of the ground plane 112, and the two sides 210*d* and 211*d* are at a distance of L5. Distance L5 is within a range of 0.001λ to 0.06λ for example, e.g., substantially equal to 0.02λ.

In an example, the distance L4 between the sides 210*a* and 211*a* is greater than the distance L5 between the sides 210*d* and 211*d*, as illustrated in FIG. 2A. In an example, the distance L4 is greater than the distance L5 by at least 0.16λ, or at least 0.14λ, or at least 0.13λ, or at least 0.12λ, or at least 0.10λ, or at least 0.08λ, or at least 0.06λ, or at least 0.04λ, or at least 0.02λ, or at least 0.01λ, for example.

In an example, the sides 210*b* and 210*d* conjoin the opposing sides 210*a* and 210*c* of the slot 124*a*. In an example, the side 210*d* is substantially parallel to the side 211*a* of the ground plane 112, and the side 210*d* has a length L6 that is within a range of 0.04λ to 0.12λ for example, e.g., substantially equal to 0.08λ. Because the side 210*c* is shorter than the side 210*a*, the side 210*b* in not parallel to the side 211*b* of the ground plane 112. In the example of FIG. 2A, the side 210*b* has multiple step-like features. Thus, the side 210*b* is non-linear in the example of FIG. 2A.

Figure 2B:
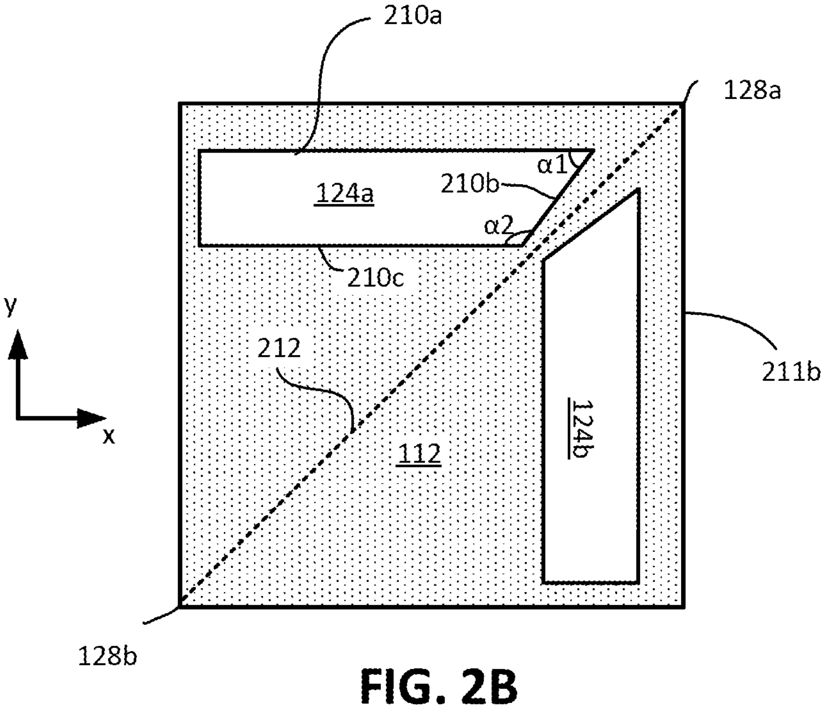
FIGS. 2B, 2C, and 2D illustrate various example shapes of aperture slots of the ground plane of the antenna system of FIGS. 1A-E, in accordance with an embodiment of the present disclosure.
Figure 2C:
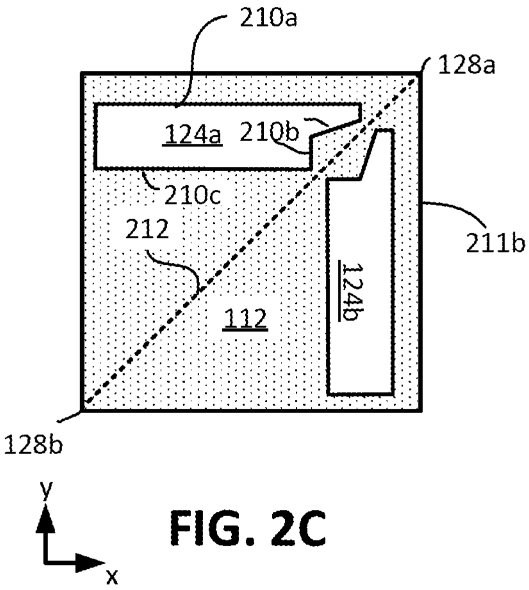
Figure 2D:
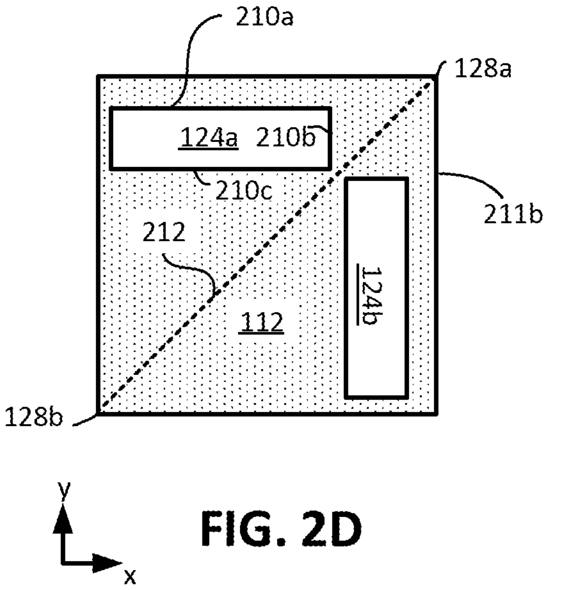

FIGS. 2B-2D illustrate various example shapes of aperture slots 124*a*, 124*b* of the ground plane 112 of the antenna system 100 of FIGS. 1A-E, in accordance with an embodiment of the present disclosure. For example, in contrast to FIG. 2A where the side 210*b* of the slot 124*a* had multiple step-like features, in FIG. 2B the side 210*b* comprises a single linear line that is not parallel to the side 211*b* of the ground plane 112. Furthermore, the side 210*b* is substantially non-perpendicular with respect to the sides 210*a* and 210*c*. For example, an angle α1 between the side 210*b* and the side 210*a* is less than 90 degrees, e.g., is at most 89 degrees, at most 88 degrees, or at most 87 degrees, or at most 86 degrees, or at most 85 degrees, or at most 84 degrees, or at most 82 degrees, or at most 80 degrees, for example. On the other hand, an angle α2 between the side 210*b* and the side 210*c* is more than 90 degrees, e.g., is at least 91 degrees, or at least 92 degrees, or at least 93 degrees, or at least 94 degrees, or at least 95 degrees, or at least 97 degrees, or at least 99 degrees, or at least 100 degrees, for example.

In an example, the angle α1 between the sides 210*b* and 210*a* is less than the angle α2 between the sides 210*b* and 210*c* by at least 2 degrees, or at least 4 degrees, or at least 6 degrees, or at least 8 degrees, or at least 10 degrees, or at least 12 degrees, or at least 14 degrees, or at least 16 degrees, or at least 18 degrees, or at least 20 degrees, for example.

In FIG. 2C the side 210*b* comprises a single step-like features, in contrast to two step-like feature of FIG. 2A. In FIG. 2D, the side 210*b* is substantially parallel to the side 211*b* of the ground plane 112. Accordingly, in FIG. 2D, the sides 210*a* and 210*c* are substantially equal in length. Note that the slots 124*a*, 124*b* of FIG. 2D may be relatively easy to form (e.g., compared to the slots of FIGS. 2A-2C), but comes at a cost of reduced length of the side 210*a*, where an increased length of the side 210*a* contributes to an increase in the bandwidth ratio of the antenna system 100.

Figure 3A:
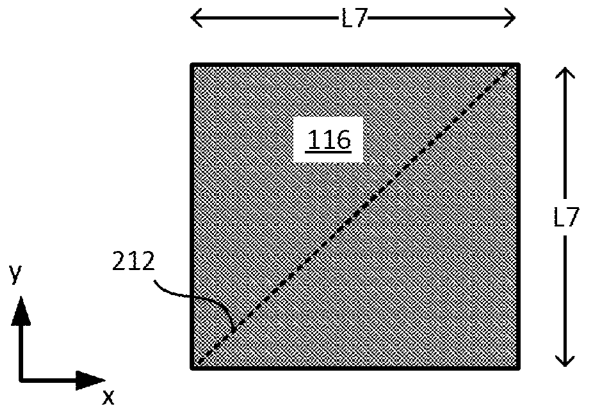
FIG. 3A illustrates a plan view of a layer of dielectric material that is below a ground plane of the antenna system of FIGS. 1A-1E, in accordance with an embodiment of the present disclosure.

FIG. 3A illustrates a plan view of a layer of dielectric material 116 that is below a ground plane 112 of the antenna system 100 of FIGS. 1A-1E, in accordance with an embodiment of the present disclosure. Referring to FIGS. 1A-1E and 3A, the ground plane 112 is above the dielectric material 116. The dielectric material 116 supports the ground plane 112. For example, the dielectric material 116 may be formed in a layer, and the ground plane 112 may be above the layer of the dielectric material 116. In an example, the dielectric material 116 separates the ground plane 112 from the feed lines 130*a*, 130*b*.

In an example, the dielectric material 116 is a substrate. In an example, the dielectric material 116 is a printed circuit board (PCB). In an example, the dielectric material 116 comprises an appropriate PCB material, FR-4, a composite material comprising woven fiberglass cloth and an epoxy resin binder, Rogers RT/Duroid® material and/or RT/Duroid® 5870 laminate provided by Rogers Corporation™, glass and/or ceramic material, composite laminate, foam, epoxy, resin, and/or another appropriate dielectric composite material.

As illustrated in FIG. 3A, in an example, the dielectric material 116 is symmetrical along the plane 212. In an example, the dielectric material 116 is in the shape of a square, or another appropriate shape such as a circle or rhombus, such that the dielectric material 116 is symmetrical along the plane 212.

In an example where the dielectric material 116 is a square, dimensions of various sides of the dielectric material 116 is L7, where L7 in an example is substantially equal to 0.5λ or less, such as at most 0.49λ, 0.48λ, 0.45λ, or 0.40λ, for example. In an example, the length L7 of FIG. 3A and the length L1 of FIG. 2A are substantially equal. Thus, for example, a lower surface of the ground plane 112 and an upper surface of the dielectric material 116 are attached to each other, and may have substantially similar lateral dimensions.

Figure 3B:
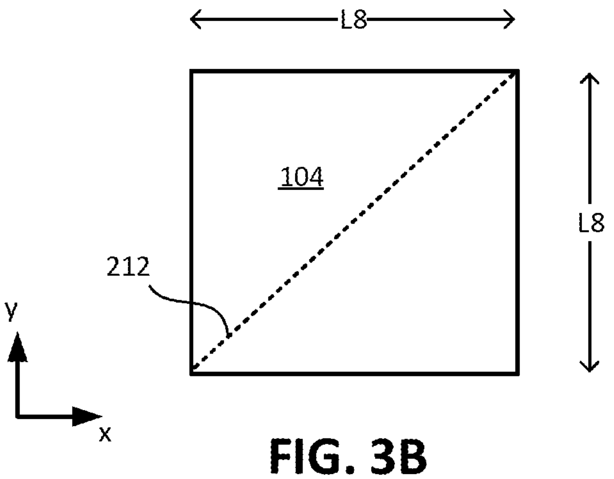
FIG. 3B illustrates a plan view of a first patch antenna and FIG. 3C illustrates a plan view of a second patch antenna of the antenna system of FIGS. 1A-1E, in accordance with an embodiment of the present disclosure.
Figure 3C:
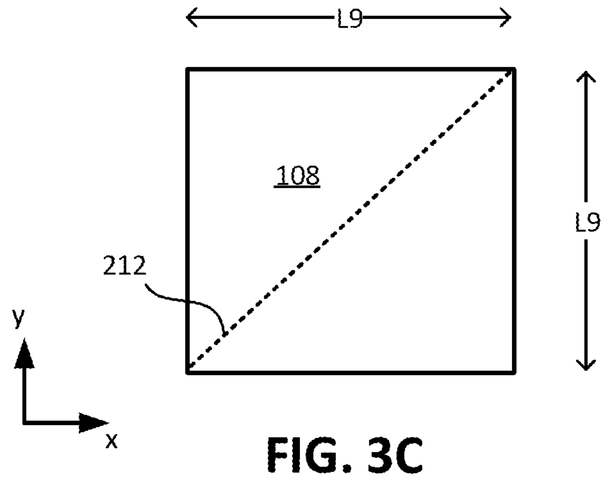

FIG. 3B illustrates a plan view of a first patch antenna 104 and FIG. 3C illustrates a plan view of a second patch antenna 104 of the antenna system 100 of FIGS. 1A-1E, in accordance with an embodiment of the present disclosure. In one embodiment, each of the patch antennas 104,108 comprises a conductive material (such as metal, for example, copper), or a non-conductive material least partially plated with a conductive material (e.g., a metal plating).

As illustrated in FIGS. 3B and 3C, in an example, each of the patch antennas 104, 108 is symmetrical along the plane 212. In an example, one or both the patch antennas 104, 108 is in the shape of a square, or another appropriate shape such as a circle or rhombus, such that each of the patch antennas 104, 108 is symmetrical along the plane 212.

In an example where the patch antennas 104 and 108 are square, dimensions of various sides of the patch antenna 104 is L8, and dimensions of various sides of the patch antenna 108 is L9, respectively, as illustrated in FIGS. 3B and 3C. In an example, the lengths L8 and L9 are different (although they may be the same in another example). In an example, because the lengths L8 and L9 are different, the two patch antennas 104 and 108 may generate two resonant frequencies. For example, one patch antenna controls a high frequency band of interest, and another patch antenna controls a low frequency band of interest, as a result of which the system 100 may operate as a wideband antenna system.

In an example length L8 is greater than L9, while in another example length L9 is greater than L8. Thus, any one of the patch antennas 104, 108 is greater than the other of the patch antennas 104, 108.

Merely as an example, one of the lengths L8 or L9 is in the range of 29λ to 0.36λ, such as substantially equal to 0.332; and the other of the lengths L8 or L9 is in the range of 0.37λ to 0.43λ, such as substantially equal to 0.42. In one example, a difference between the lengths L8 and L9 (e.g., |L8−L9|) is at least 0.01λ, or at least 0.02λ, or at least 0.03λ, or at least 0.04λ, or at least 0.05λ, or at least 0.06λ, or at least 0.07λ, or at least 0.08λ, or at least 0.09λ, or at least 0.1λ, or at least 0.12λ, or at least 0.14λ, or at least 0.15λ, for example.

Figure 4A:
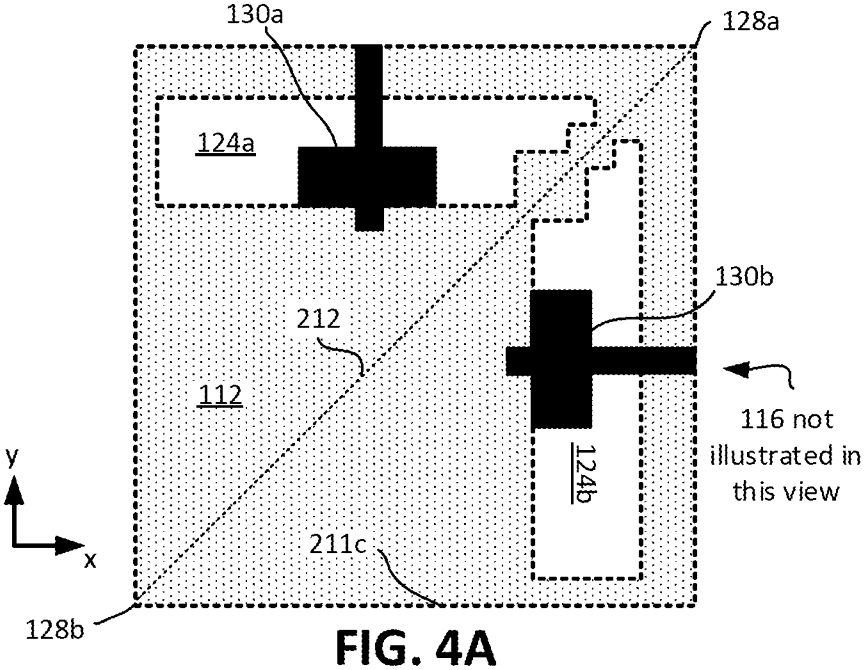
FIGS. 4A and 4B illustrate various views of a first feed line and a second feed line of the antenna system of FIGS. 1A-1E, in accordance with an embodiment of the present disclosure.
Figure 4B:
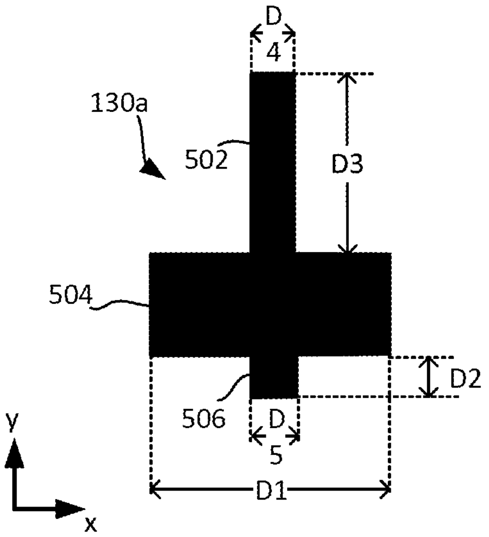

FIGS. 4A and 4B illustrate a first feed line 130*a* and a second feed line 130*b* of the antenna system 100 of FIGS. 1A-1E, in accordance with an embodiment of the present disclosure. Specifically, FIG. 4A illustrates both the feed lines 130*a*, 130*b*, whereas FIG. 4B illustrates only one example feed line 130*a*. In one embodiment, the feed lines 130*a*, 130*b* comprises an electrically conductive material (such as a metal or an alloy thereof, e.g., copper) or a non-conductive material plated with an electrically conductive material.

In an example, one of the feed lines 130*a*, 130*b* and the corresponding one of the aperture slots 124*a*, 124*b* are used for vertical polarization signals, and the other of the feed lines 130*a*, 130*b* and the corresponding one of the aperture slots 124*a*, 124*b* are used for horizontal polarization signals. Merely as an example, the feedline 130*a* and the aperture slot 124*a* are used for horizontal polarization, and the feedline 130*b* and the aperture slot 124 are used for vertical polarization.

The view of FIG. 4A is a bottom-up view, e.g., when viewed from the bottom and looking up. Note that in the view of FIG. 4A, the dielectric material 116 is between the feed lines 130*a*, 130*b* and the ground plane 112. However, the dielectric material 116 is not illustrated in FIG. 4A, e.g., to depict the positioning of the feed lines 130*a*, 130*b* with respect to the slots 124*a*, 124*b* of the ground plane 112. Because the ground plane 112 and the corresponding slots 124*a*, 124*b* would not be visible in the bottom-up view of FIG. 4A, the ground plane 112 and the corresponding slots 124*a*, 124*b* are illustrated using dotted lines in FIG. 4A.

In one embodiment, the feed line 130*a* is aligned (e.g., at least in part below) the slot 124*a* and the feed line 130*b* is aligned (e.g., at least in part below) the slot 124*b*. In one embodiment, the feed lines are symmetrical with respect to each other along the plane 212. Accordingly, the feed lines 130*a* and 130*b* have substantially the same shape and size. Thus, FIG. 4B illustrates the example feed lines 130*a* and the discussion with respect to feed line 130*a* is also applicable for the feed line 130*b*.

FIGS. 4A and 4B illustrate an example shape of the feed lines 130*a* and 130*b*, although other shapes of the feed lines may also be possible (e.g., as long as the feed lines are substantially symmetrical along the plane 212). In an example and as illustrated in FIG. 4B, each of the feed lines 130*a*, 130*b* has a shape of "T", with a stub 506 extending from a top portion of the T shaped feed line. In an example, the stub 506 of the feed line 130*a* may be used for controlling impedance of the corresponding feed lines 130*a*.

For example, as illustrated in FIG. 4B, the feed line 130*a* comprises a horizontal portion 504, a first vertical portion 502 on a first side of the horizontal portion 504, and a second vertical portion 506 on a second side of the horizontal portion 504. For example, each of the first and second vertical portions 502 and 506 extend from a mid-portion of the horizontal portion 504. As illustrated, the horizontal portion 504 is substantially orthogonal to each of the vertical portions 502 and 506.

A length (e.g., along Y-axis direction) of the vertical portion 502 is D3 and a length (e.g., along Y-axis direction) of the vertical portion 506 is D2. In an example, D3 is substantially greater than D2. For example, D3 is in a range of 0.1λ to 0.18λ, e.g., substantially equal to 0.14λ in an example. Also, D2 is in a range of 0.001λ to 0.06λ, e.g., substantially equal to 0.02λ in an example. In an example, D3 is greater than D2 by at least 0.01λ, or at least 0.02λ, or at least 0.03λ, or at least 0.05λ, or at least 0.07λ, or at least 0.09λ, or at least 0.1λ, or at least 0.11λ, or at least 0.12λ, or at least 0.13λ, or at least 0.14λ, in an example.

In one embodiment, a length (e.g., along X-axis direction) of the horizontal portion 504 is D1, where D1 is within a range of 0.06λ to 0.14λ, e.g., substantially equal to 0.1λ in an example. In one embodiment, a width (e.g., along X-axis direction) of the vertical portion 502 is D4, and a width (e.g., along X-axis direction) of the vertical portion 506 is D5, where in an example D4 and D5 are substantially similar (e.g., differs by at most 0.01λ, or by at most 0.02λ, or by at most 0.03λ in an example). In one embodiment, one or both the widths D4 and/or D5 is within a range of 0.003λ to 0.01λ, e.g., substantially equal to 0.007λ in an example.

As illustrated in FIG. 4A, in an example, a substantial section (e.g., an entirety) of the portion 504 of the feed line 504 is below a corresponding slot 124*a*. In contrast, in an example, substantially no section of the portion 506 of the feed line 130*a* is below the corresponding slot 124*a*. A section of the portion 502 of the feed line 130*a* is below the slot 124*a*, while another section of the portion 502 of the feed line 130*a* is not below the slot 124*a*, in an example.

Figure 5A:
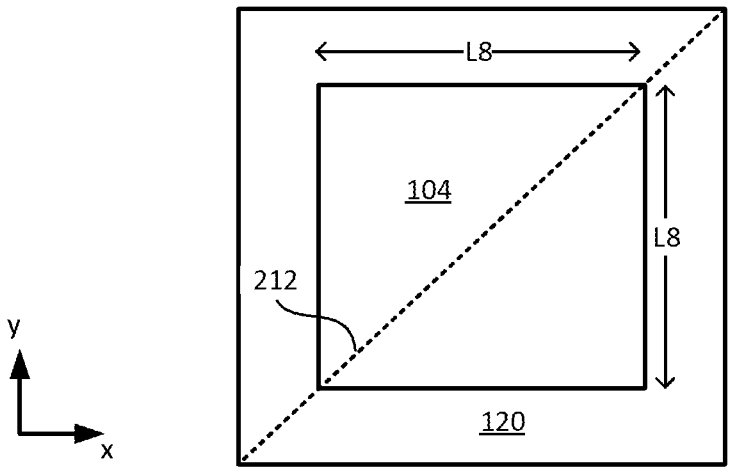
FIGS. 5A and 5B illustrate various views of the antenna system of FIGS. 1A-1E, and illustrates a dielectric material between two patch antennas of the antenna system, in accordance with an embodiment of the present disclosure.
Figure 5B:
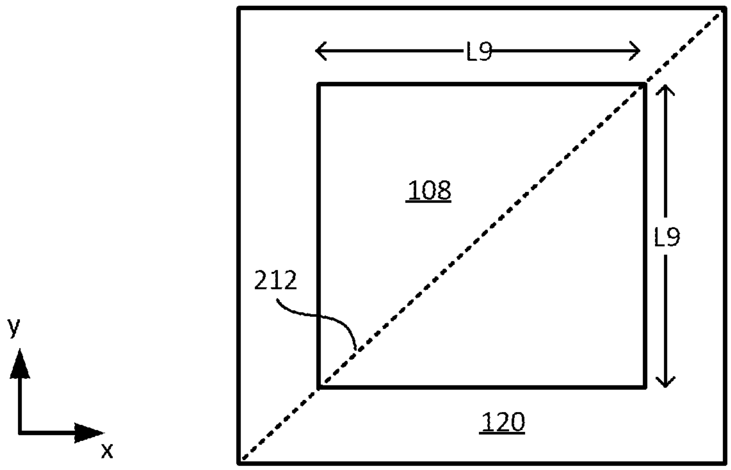

FIGS. 5A and 5B illustrate various views of the antenna system 100 of FIGS. 1A-1E, and illustrates a dielectric material 120 between the two patch antennas 104 and 108 of the antenna system 100, in accordance with an embodiment of the present disclosure. The view of FIG. 5A is along line B-B' of FIG. 1D. Thus, FIG. 5A illustrates a plan view of the system 100. The cross-sectional view of FIG. 5B is along line C-C' of FIG. 1D.

Referring to FIGS. 1D, 5A, and 5B, illustrated is the dielectric material 120 that separates the patch antenna 108 from the ground plane 112, and also separates the patch antenna 108 from the patch antenna 104. Thus, the dielectric material 120 supports the patch antenna 108 above the ground plane 112, and also supports the patch antenna 104 above the patch antenna 108 and the ground plane 112.

In the examples of FIGS. 1D, 5A, and 5B, the same dielectric material 120 is between the ground plane 112 and the patch antenna 108, and also between the patch antenna 108 and the patch antenna 104. In one embodiment, the dielectric material 120 comprises an appropriate dielectric composite material, such as an appropriate foam or resin.

In an example, a dielectric constant of the dielectric material 116 is different from (e.g., higher than) a dielectric constant of the dielectric material 120. In an example, the dielectric constant of the dielectric material 120 may be relatively low, e.g., less than 2.5, or less than 2. λ, or less than 2.0, or less than 1.8, or less than 1.5, or less than 1.3, for example. For example, the dielectric material 120 may be a foaming material with sufficient porosity, e.g., resulting in sufficiently low dielectric constant. In an example, the dielectric constant of the dielectric material 120 being low (e.g., lower than the dielectric constant of the dielectric material 116 and/or being within the range discussed above) may facilitate in gaining a high bandwidth (such as at least an octave bandwidth ratio) for the antenna system 100.

In an example and as seen in FIG. 1D, a section of the dielectric material 120 between the ground plane 112 and the patch antenna 108 has a height (e.g., along the Z-axis direction) of H1, and another section of the dielectric material 120 between the patch antennas 104 and 108 has a height (e.g., along the Z-axis direction) of H2. In an example, H1 and H2 may be substantially the same. In another example, H1 and H2 may differ by at least 0.002λ, or by at least 0.004λ, or by at least 0.008λ, or by at least 0.01λ, or by at least 0.015λ, or by at least 0.02λ, or by at least 0.025λ, or by at least 0.03λ, for example. In an example, H2 is greater than H1. In an example, height H1 is within a range of 0.01λ to 0.08λ, such as substantially equal to 0.04λ in an example. In an example, height H2 is within a range of 0.01λ to 0.1λ, such as substantially equal to 0.06λ in an example.

FIG. 1D1 illustrates further detail of the cross-sectional view of FIG. 1D. For example, in FIG. 1D, an adhesive layer 117 is between the ground plane 112 and the dielectric material 116. For example, the ground plane 112 is attached to the dielectric material 116 using the adhesive layer 117. Note that in an example, there may not be any such adhesive layer between the ground plane 112 and the dielectric material 120, e.g., as the dielectric material 120 may be provided or grown (such as using a foaming process) above the ground plane 112, without needing to have an adhesive layer between the ground plane 112 and the dielectric material 120. However, in another example, an adhesive layer may be between the ground plane 112 and the dielectric material 120.

FIGS. 5C, 5D, 5E, and 5F illustrate alternate structures of the dielectric material 120 that is between the two patch antennas 104, 108 and/or between a lower patch antenna 104 and the ground plane 112, in accordance with an embodiment of the present disclosure.

In FIG. 1D, the patch antenna 104 is on the dielectric material 120*b*. In contrast, in FIG. 5C, the patch antenna 104 at least in part extends within the dielectric material 120. Thus, in FIG. 5D, the dielectric material 120 is on a bottom surface and on at least a part of one or more side surfaces of the patch antenna 104.

Figure 5C:
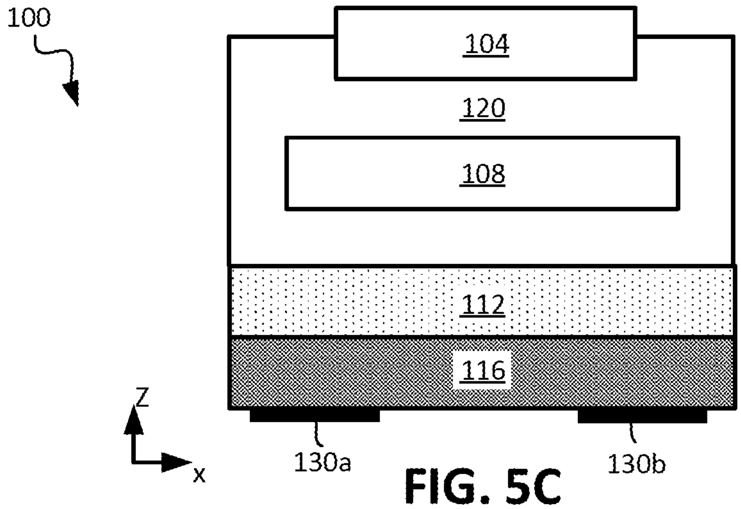
FIGS. 5C, 5D, 5E, and 5F illustrate alternate structures of a dielectric material that is between two patch antennas and/or between a lower patch antenna and a ground plane of the antenna system of FIGS. 1A-1E, in accordance with an embodiment of the present disclosure.
Figure 5D:
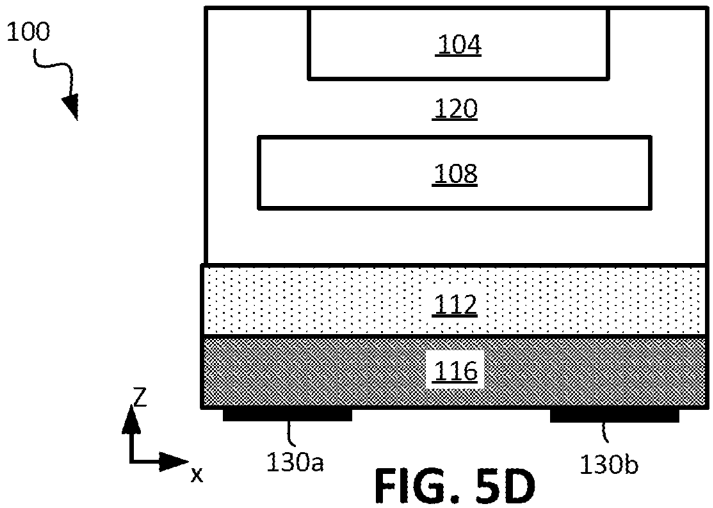

In FIG. 5D, the patch antenna 104 extends substantially entirely within the dielectric material 120*b*. Thus, in FIG. 5E, the dielectric material 120 is on a bottom surface and on an entirety of one or more (e.g., all) side surfaces of the patch antenna 104. For example, a top surface of the patch antenna 104 and a top surface of the dielectric material 104 are flush or coplanar.

Figure 5E:
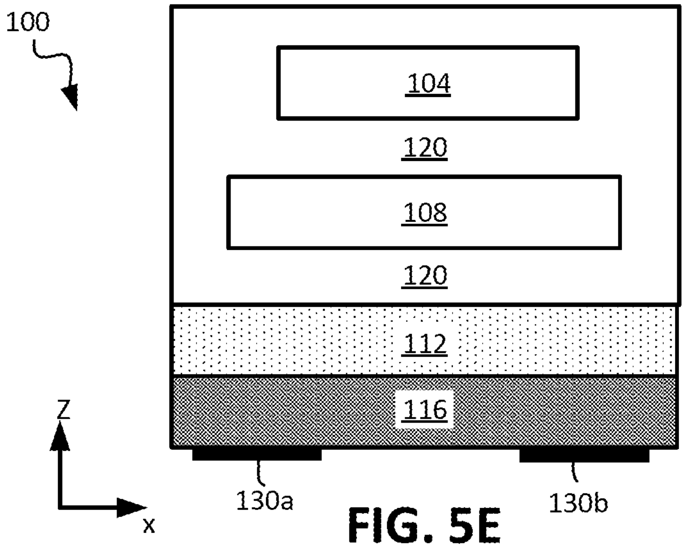

In FIG. 5E, the patch antenna 104 extends entirely within the dielectric material 120, and is substantially encapsulated by the dielectric material 120. Thus, in FIG. 5F, the dielectric material 120 is on a bottom surface, on one or more (e.g., all) side surfaces, as well as on a top surface of the patch antenna 104. Thus, in FIG. 5F, the dielectric material 120*b* may act as a radome or overlay material for the antenna system 100.

Figure 5F:
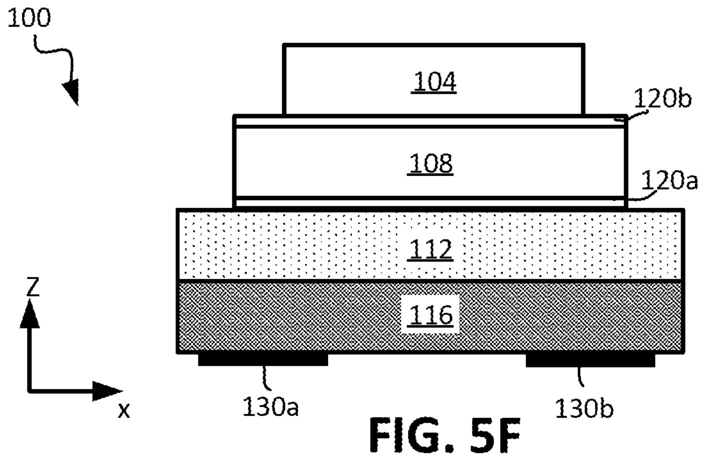

FIG. 5F illustrates an example where dielectric material 120 is deposited as thin films dielectric material 120*a*, 120*b*. Each thin film of dielectric material 120*a*, 120*b* may comprise an epoxy film, or another appropriate film structure comprising dielectric material. In an example, a height of the thin film of dielectric material 120*a* and/or 120*b* may be relatively small, such as less than 0.05λ, or less than 0.01λ, or less than 0.005λ, or less than 0.001λ, for example. Thus, for example, the dielectric material 120 may be substantially transparent to the signals being transmitted by the system 100.

Figure 5G:
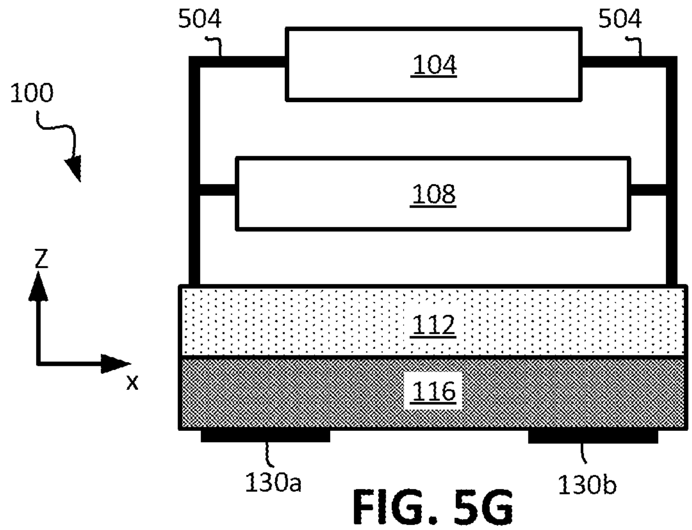
FIGS. 5G and 5H illustrate the antenna system of FIGS. 1A-1E, but without a dielectric fill material between the two patch antennas and/or between a lower patch antenna and the ground plane, in accordance with an embodiment of the present disclosure.
Figure 5H:
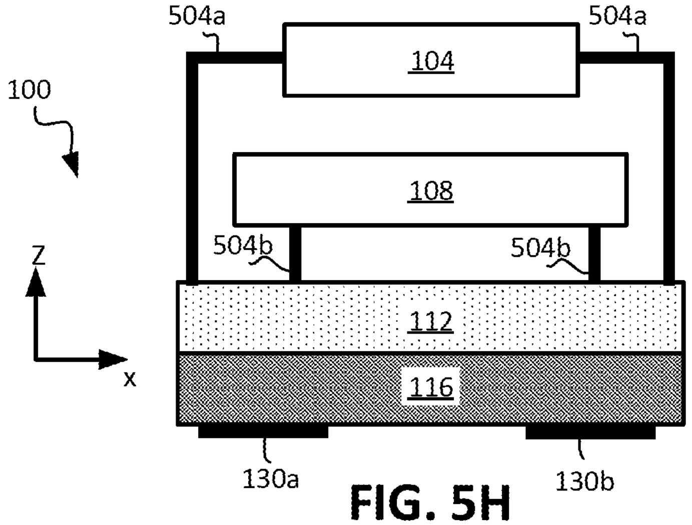

FIGS. 5G and 5H illustrate the antenna system 100 of FIGS. 1A-1E, but without a dielectric fill material between the two patch antennas 104, 108 and/or between a lower patch antenna 104 and the ground plane 112, in accordance with an embodiment of the present disclosure.

For example, in FIG. 5H, the space between the two patch antennas 104, 108 and/or between a lower patch antenna 104 and the ground plane 112 is empty, and air (or another appropriate gas or vacuum) within this space acts as dielectric material. In one embodiment, supporting structures 504 support the patch antennas 108 and 104 above the ground plane 112. Thus, the patch antennas 108 and 104 are fixed above the ground plane 112 by the supporting structures 504. For example, a common structure 504 is coupled between the ground plane 112 and the patch antenna 108, and also between the ground plane 112 and the patch antenna 104. Note that only two such structures 504 are visible in the cross-sectional view of FIG. 5H, and there may be more than two such structures that are not visible in the cross-sectional view. In one embodiment, the supporting structures 504 comprise non-conductive material, e.g., to avoid electrical coupling between the ground plane and the patch antennas 104, 108.

In the example of FIG. 5I, supporting structures 504*a* support the patch antenna 104 above the ground plane 112, and supporting structures 504*b* support the patch antenna 108 above the ground plane 112. Thus, the patch antennas 108 and 104 are fixed above the ground plane 112 respectively by the supporting structures 504*a* and 504*b*. Note that only two instances of each of the structures 504*a* and 504*b* are visible in the cross-sectional view of FIG. 5I, and there may be more than two such instances of each of the structures that are not visible in the cross-sectional view. In one embodiment, the supporting structures 504*a*, 504*b* comprise non-conductive material, e.g., to avoid electrical coupling between the ground plane and the patch antennas 104, 108.

Although not illustrated in FIGS. 1A-1E, in an example, a radome or another overlay material may be present above the patch antenna 108. The radome may include dielectric or other impedance matching materials to provide physical protection and temperature resilience for the antenna system 100, and/or to increase power transfer and reduce signal reflection into and out of the antenna system 100. In another example, no such radome may be present.

Figure 6:
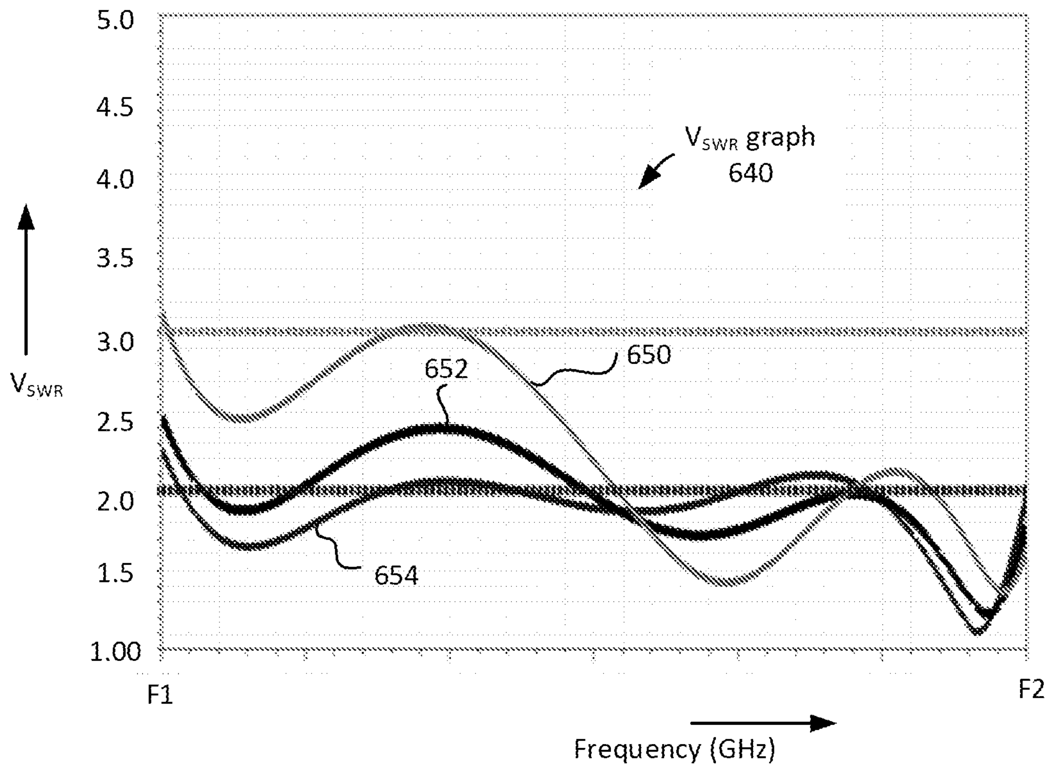
FIG. 6 illustrates a graph depicting VSWR (Voltage Standing Wave Ratio) parameter plots for the antenna system of FIG. 1A-1E, in accordance with an embodiment of the present disclosure.

FIG. 6 illustrates a graph 640 depicting VSWR (Voltage Standing Wave Ratio) parameter plots for the system 100 of FIG. 1A-1E, in accordance with an embodiment of the present disclosure. The X axis represents frequency and the Y axis represents the VSWR. In an example, the upper frequency F2 is at least twice the lower frequency F1 of the graph of FIG. 6, e.g., F2/F1 is about at least 2. Three plots 650, 652, 654 are depicted in FIG. 6. In an example, the plot 650 is for 45 degree scanning of the antenna system 100, the plot 652 is for 30 degree scanning of the antenna system 100, and the plot 654 is for broadside scanning of the antenna system 100. As illustrated, the VSWR is less than 3.0 in the example plots of FIG. 6.

As illustrated in FIG. 6, a bandwidth ratio of at least 2:1 may be achieved by the system 100. For example, a bandwidth between 7.5 GHz and 15 GHz is achievable in an example, by appropriately tuning dimensions of various components of the system 100. Thus, the system 100 is dual polarized (e.g., horizontal and vertical polarizations) and mechanically and electrically symmetrical, and aperture-fed antenna system comprising multiple (e.g., two in the examples of FIGS. 1A-1E) stacked patch antennas. An octave bandwidth of at least 2:1 may be achieved by the system 100, as illustrated in FIG. 6.

FIGS. 7A-7E illustrate an antenna array 700 comprising a plurality of antenna structures 702, in accordance with an embodiment of the present disclosure. In an example, each antenna structure 702 comprises the antenna system 100 of FIGS. 1A-5B. For example, the antenna systems 100 may be arranged in an array, to form the antenna array 700. Thus, the antenna array 700 is a collection of individual antenna structures 702, each of which is similar to the antenna system 100 discussed herein.

Figure 7A:
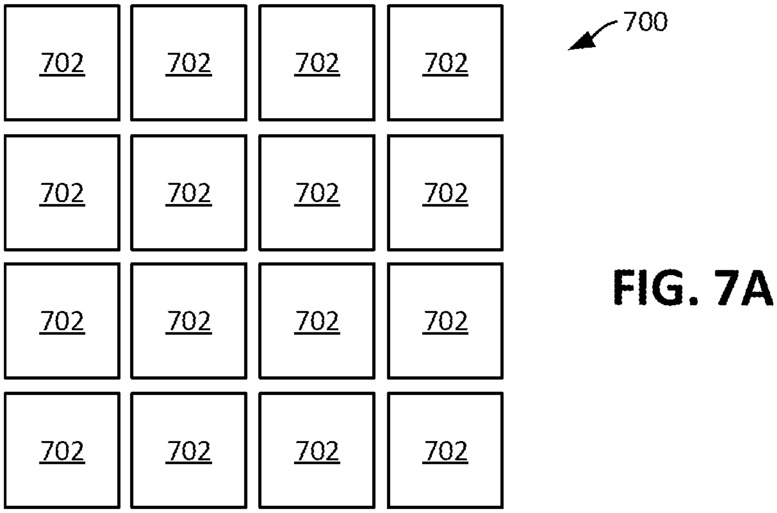
FIGS. 7A-7E illustrate an antenna array comprising a plurality of antenna structures, where each antenna structure comprises the antenna system of FIGS. 1A-5B, in accordance with an embodiment of the present disclosure.

FIG. 7A schematically illustrates the antenna array 700 including laterally adjacent antenna structures 702 arranged in an array, where each antenna structure 702 comprises the antenna system 100 of FIGS. 1A-5B.

Figure 7B:
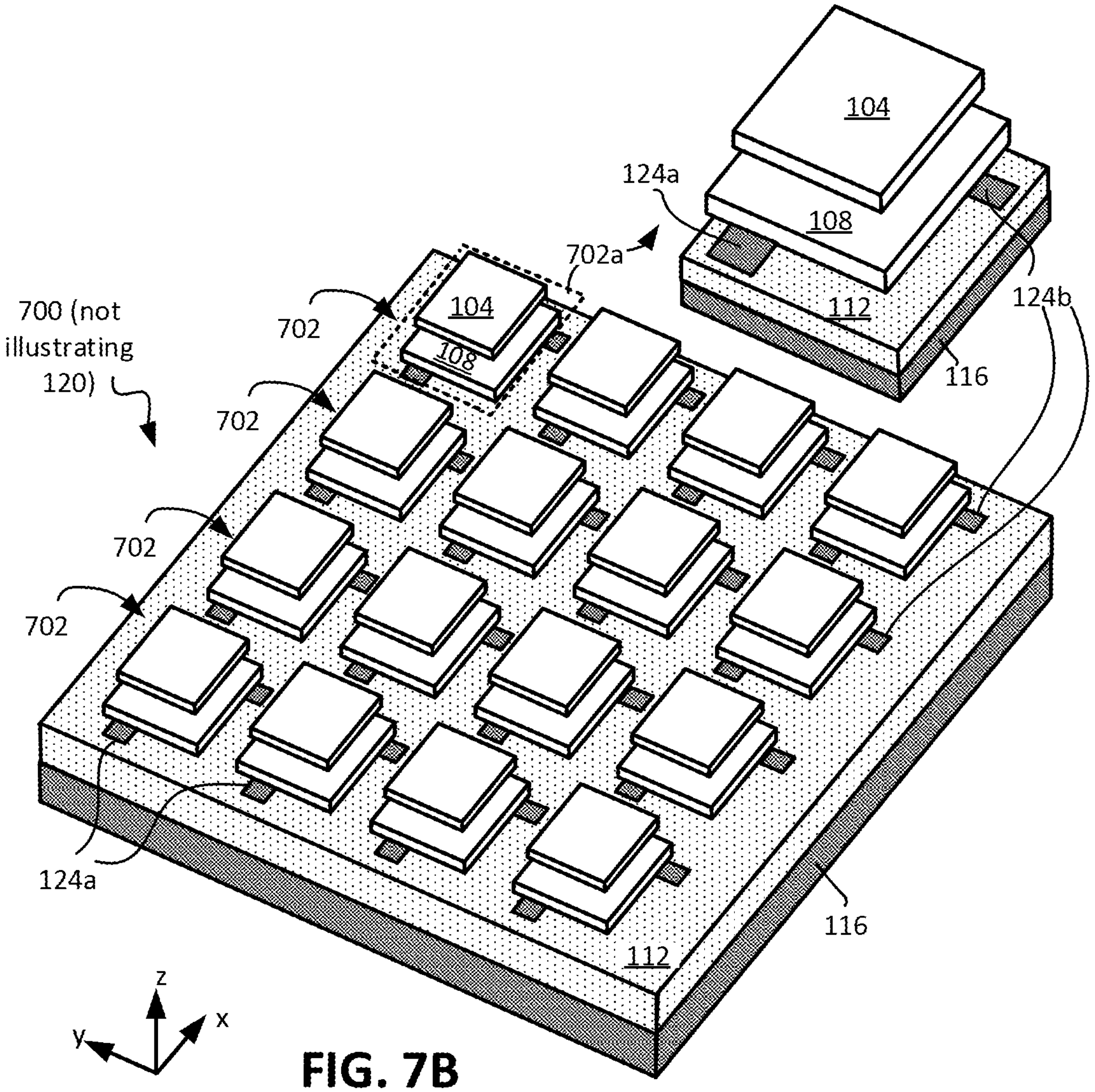

FIGS. 7B-7E illustrate perspective views of the antenna array 700. For example, in FIG. 7B, the antenna array 700 is illustrated without the dielectric material 120. Accordingly, in FIG. 7B, patch antennas 104, 108 of individual antenna systems 702 are visible, along with corresponding aperture slots 124*a* and 124*b*. An example antenna structure 702*a* is illustrated in FIG. 7B in further detail. As illustrated, the example antenna structure 702*a* includes the patch antennas 104, 108, the aperture slots 124*a*, 124*b* within the ground plane 112, and the dielectric material 116. As also illustrated, the ground plane 112 is a common, monolithic and continuous ground plane for multiple (e.g., all) the antenna structures 702 of the array 700. Similarly, the dielectric material 116 is a common, monolithic and continuous layer of dielectric material for multiple (e.g., all) the antenna structures 702 of the array 700.

Figure 7C:
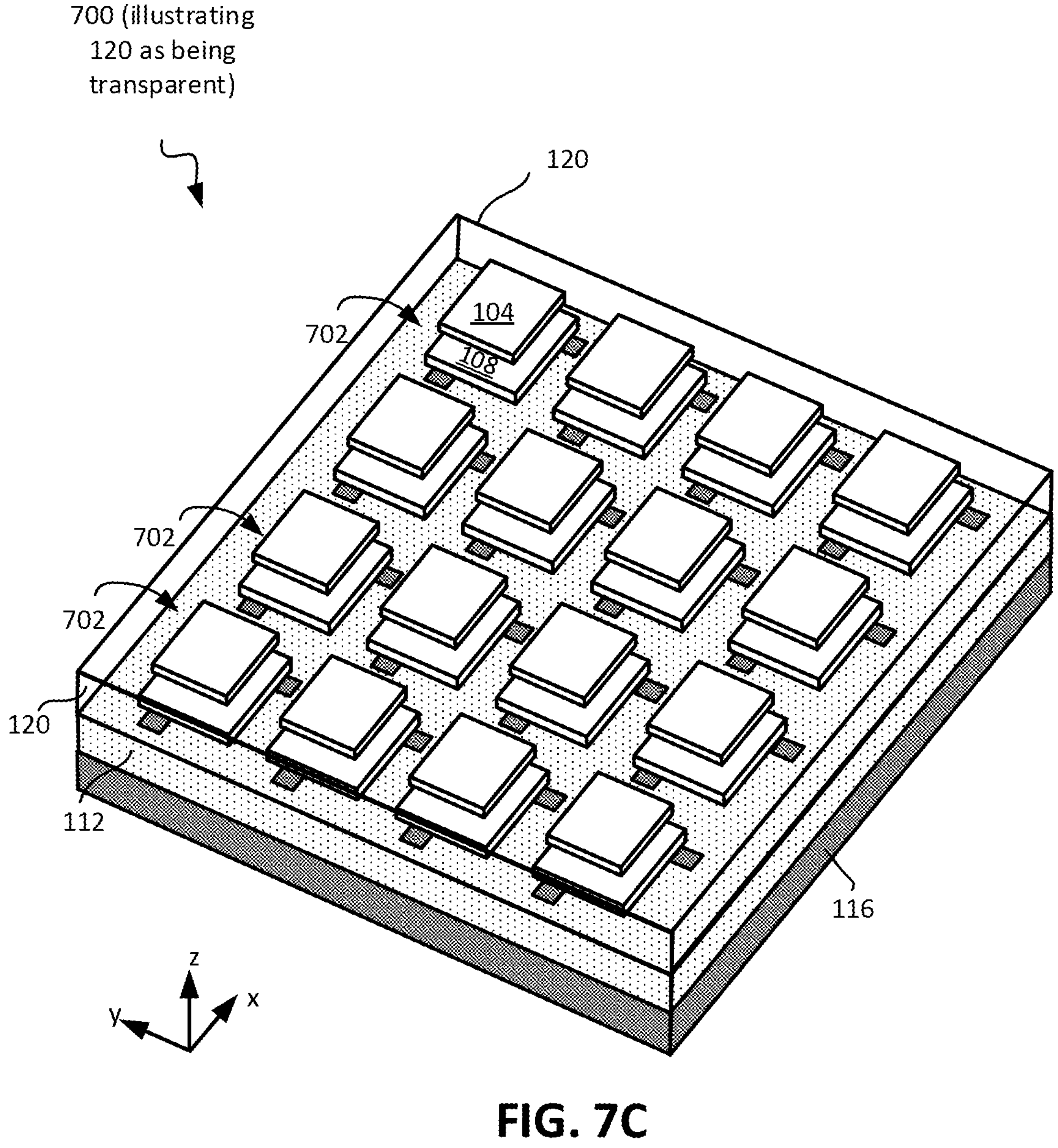

In FIG. 7C, the antenna array 700 is illustrated, with the dielectric material 120 shown as being transparent. Accordingly, in FIG. 7C, patch antennas 104, 108 of individual antenna systems 702 are visible through the dielectric material 120, along with corresponding aperture slots 124*a* and 124*b*. As illustrated, the dielectric material 120 is a common, monolithic and continuous layer of dielectric material for multiple (e.g., all) the antenna structures 702 of the array 700.

Figure 7D:
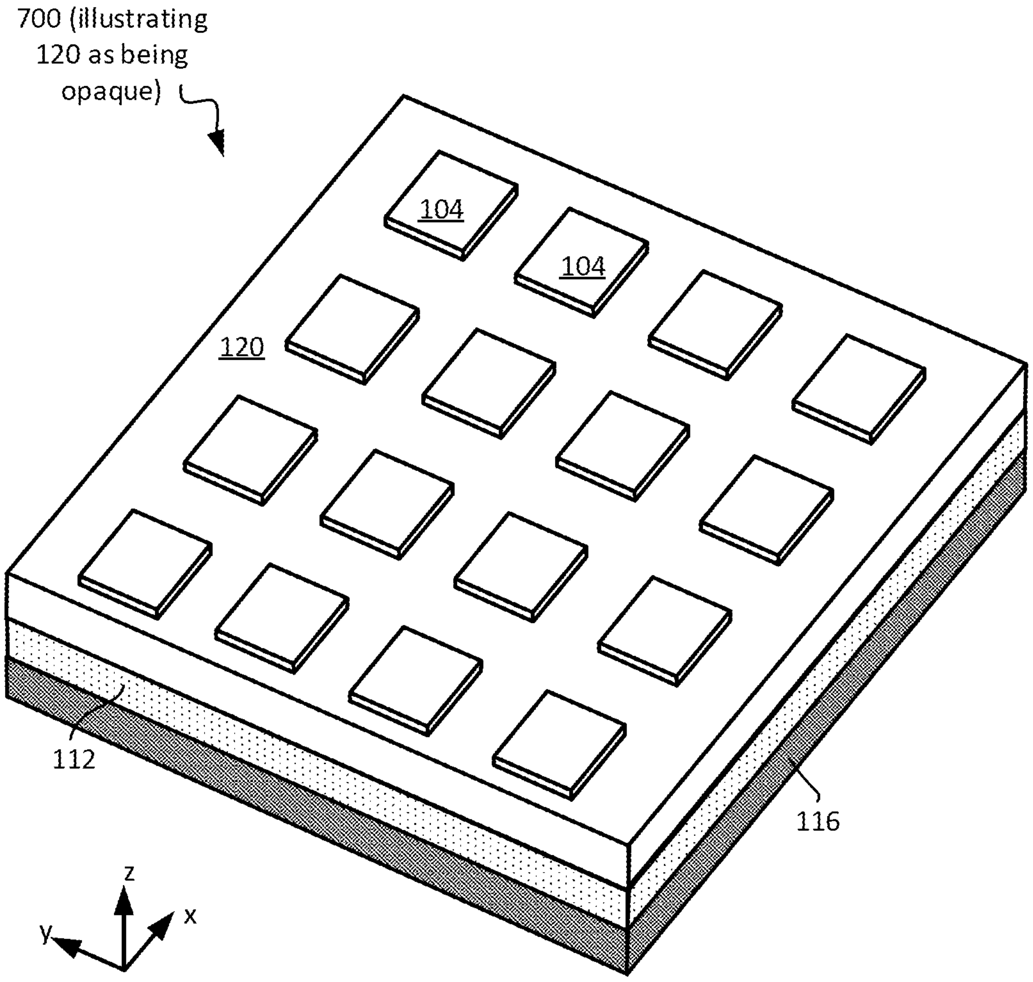

In FIG. 7D, the antenna array 700 is illustrated, with the dielectric material 120 shown as being opaque. Accordingly, in FIG. 7D, a patch antenna 104 of each antenna system 702 is visible, as the patch antenna 104 is at least in part above the dielectric material 120 in an example (see FIGS. 1D and 5C, for example). As illustrated, the dielectric material 120 is a common, monolithic and continuous layer of dielectric material for multiple (e.g., all) the antenna structures 702 of the array 700.

Figure 7E:
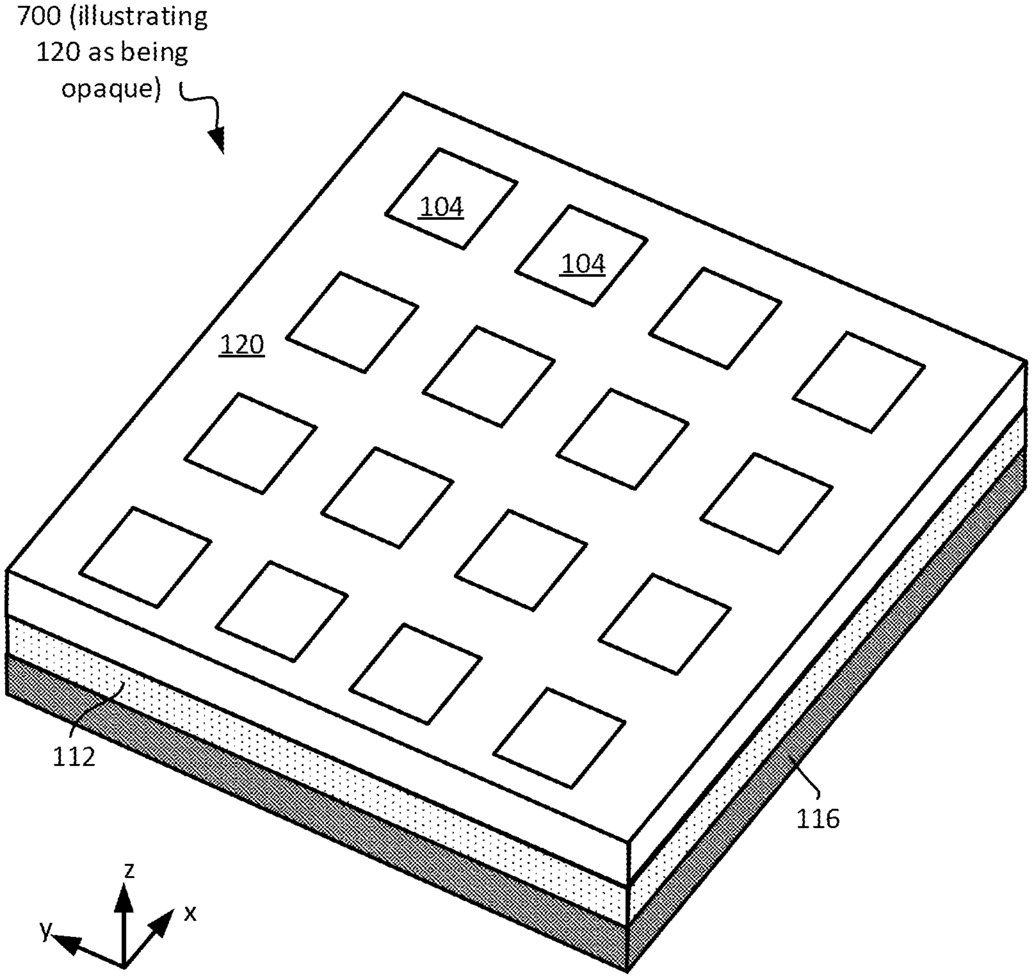

In FIG. 7D, at least a section of individual patch antennas 104 extend above the dielectric material 120, e.g., as discussed with respect to FIGS. 1D and 5C. In contrast, in FIG. 7E, an upper surface of individual patch antennas 104 and an upper surface of the dielectric material 120 are flush or coplanar, e.g., as discussed with respect to FIG. 5D. In an example, after forming the dielectric material 120, the dielectric material 120 may be planarized (e.g., using an appropriate polishing or machining operation), such that the upper surface of individual patch antennas 104 and the upper surface of the dielectric material 120 are flush or coplanar, as illustrated in FIG. 7E.

Method of Manufacturing

Figure 8:
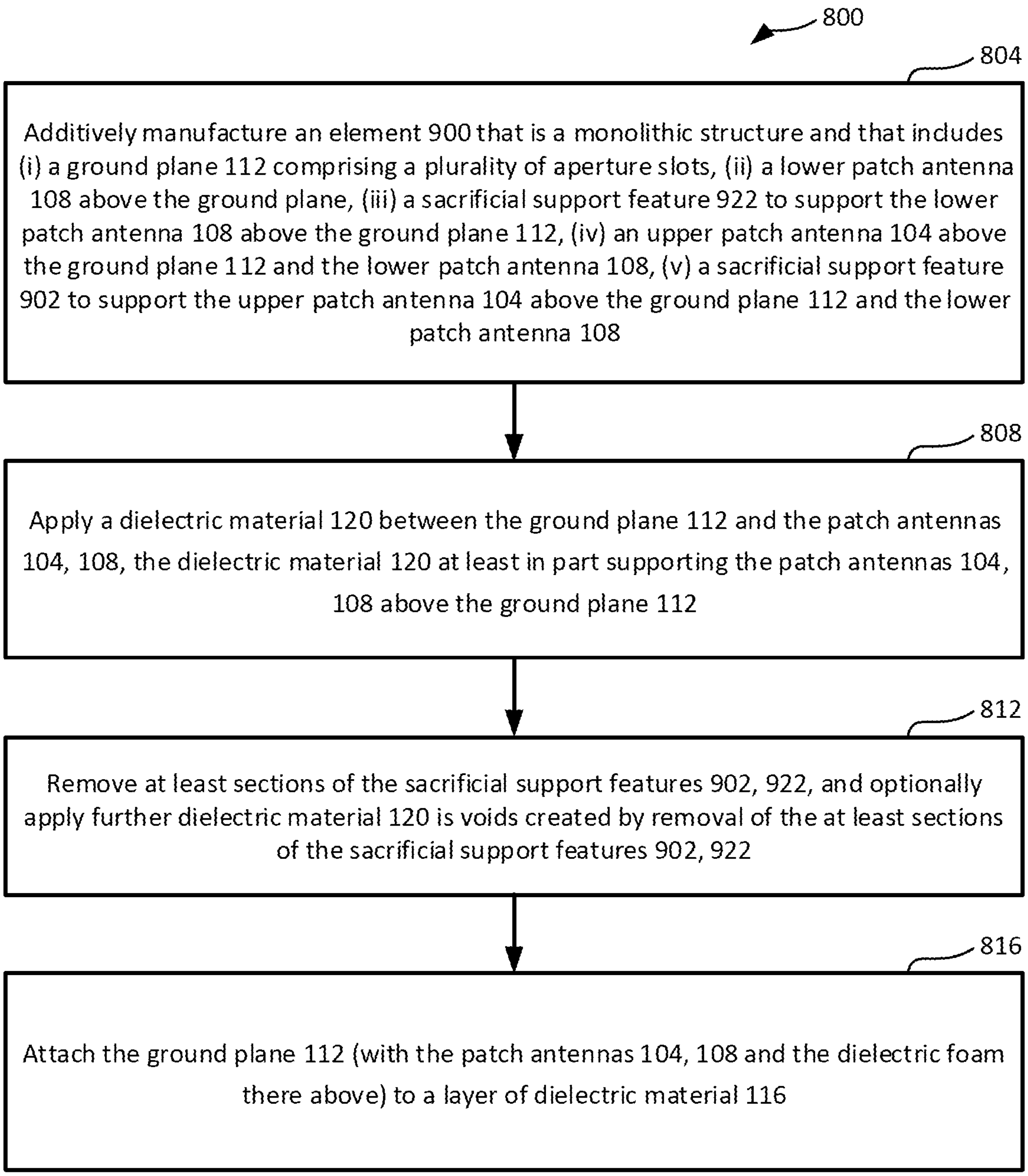
FIG. 8 illustrate a flowchart depicting a method of forming the example antenna system of FIGS. 1A-5B and the example antenna array of FIGS. 7A-7E, in accordance with an embodiment of the present disclosure.

FIG. 8 illustrate a flowchart depicting a method 800 of forming the example antenna system 100 and the example antenna array 700 of FIGS. 1A-7E, in accordance with an embodiment of the present disclosure. FIGS. 9A, 9B, 9C, 9D, 9E, 9F, 10A, 10B, 10C, 10D, 11A, 11B, 11C, 11D, 11E, 11F, 12A, 12B, 12C, 12D, 12E, and 12F collectively illustrate an example antenna system 100 and an example antenna array 700 (e.g., the antenna system 100 and the antenna array 700 of FIGS. 1A-7E) in various stages of processing in accordance with the methodology 800 of FIG. 8, in accordance with an embodiment of the present disclosure. FIGS. 8 and (9A-12C) will be discussed in unison.

Referring to the method 800 of FIG. 8, at 804, an element 900 is additively manufactured. In an example, the element 900 is a monolithic and continuous structure. The element 900 being a monolithic and continuous structure implies that any section of the element 900 is conjoined (e.g., physically joined) with any other section of the element 900 via one or more intervening elements. Thus, the element 900 is a single integral element that has been additively manufactured.

In an example, the element 900 includes (i) a ground plane 112 comprising a plurality of aperture slots 124*a*, 124*b*, (ii) a lower patch antenna 108 above the ground plane 112, (iii) a sacrificial support feature 922 to support the lower patch antenna 108 above the ground plane 112, (iv) an upper patch antenna 104 above the ground plane 112 and the lower patch antenna 108, and (v) a sacrificial support feature 902 to support the upper patch antenna 104 above the ground plane 112 and the lower patch antenna 108.

In an example, additively manufacturing the element 900 may include using any appropriate additive manufacturing techniques to form the element 900. For example, additively manufacturing the element 900 may include printing the element 900 using a three-dimensional (3D) printer. Additive manufacturing, such as 3D printing, uses computer-aided-design (CAD) software and/or 3D object scanners to direct hardware to deposit material, layer upon layer, in precise geometric shapes. As its name implies, additive manufacturing adds material to create an object. Thus, additive manufacturing involves a computer controlled process that creates 3D objects, such as the element 900, by depositing materials, usually in layers.

Figure 9A:
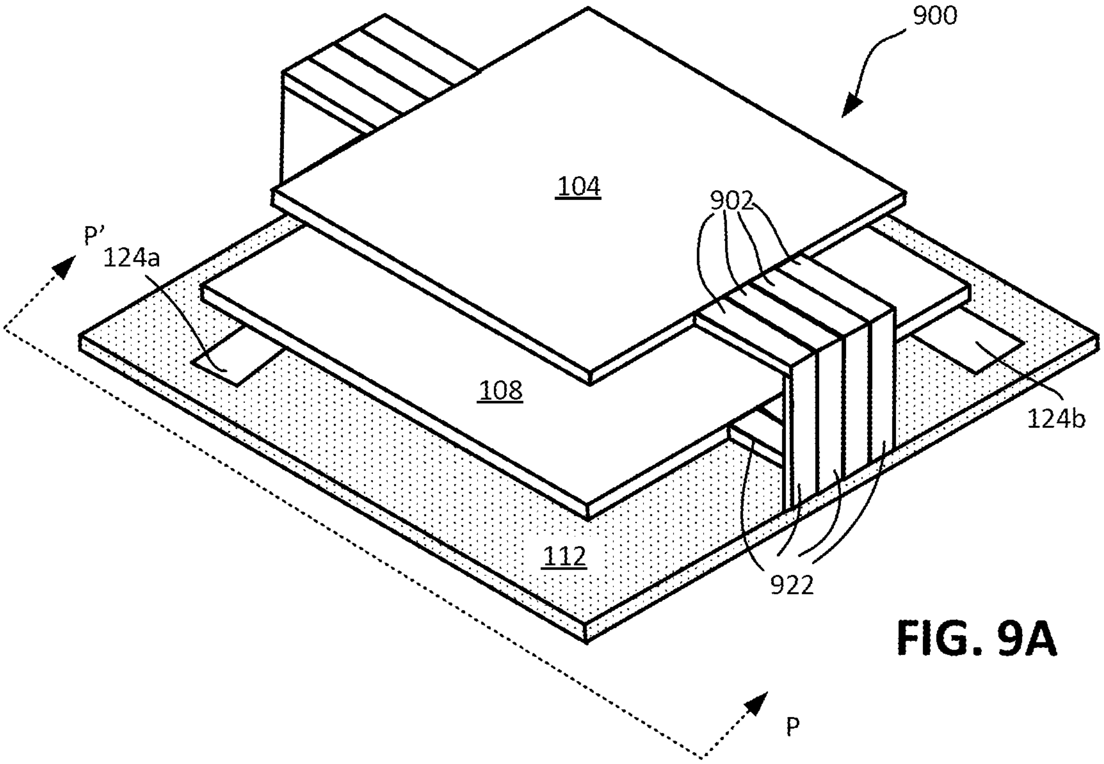
FIGS. 9A, 9B, 9C, 9D, 9E, 9F, 10A, 10B, 10C, 10D, 11A, 11B, 11C, 11D, 11E, 11F, 12A, 12B, 12C, 12D, 12E, and 12F collectively illustrate an example antenna system and an example antenna array (e.g., the antenna system of FIGS. 1A-5B and the antenna array of FIGS. 7A-7E) in various stages of processing in accordance with the methodology of FIG. 8, in accordance with an embodiment of the present disclosure.
Figure 9B:
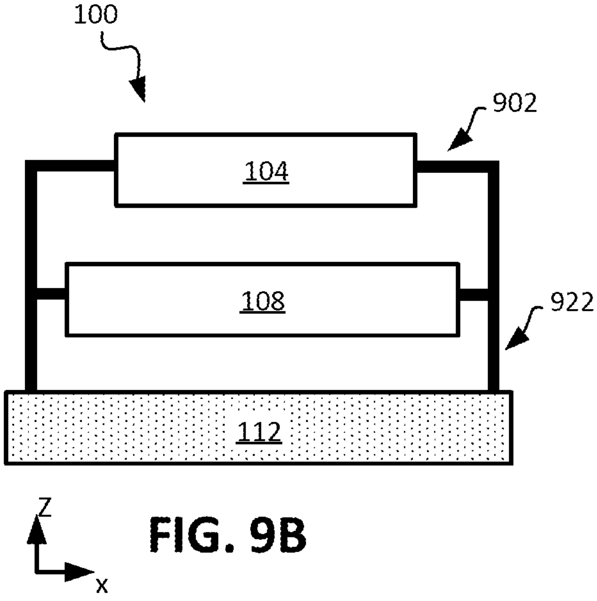

FIG. 9A illustrates a perspective view of the element 900, and FIG. 9B illustrates a cross-sectional view of the element 900. The cross-sectional view of FIG. 9B is along line P-P' of FIG. 9A.

As illustrated in FIG. 9A, the ground plane 112 comprises the aperture slots 124*a* and 124*b*. Example shapes, sizes, and locations of the aperture slots have been discussed with respect to FIGS. 1A-7E, such as with respect to FIGS.

2A-2D in further detail. Although FIG. 9A (and various other figures herein) illustrates two aperture slots 924*a*, 924*b* and their example shapes and locations within the ground plane 112, in an example, the ground plane 112 may have a different number of aperture slots (such as one, three, or more), may have the aperture slots in locations different from those illustrated in FIG. 9A, and/or may have any appropriate shapes and/or sizes of the aperture slots.

As illustrated in FIG. 9A, the patch antenna 108 is above the ground plane 112, and the patch 104 is above the patch antenna 104. Note that at this point, the dielectric material 120 has not yet been applied to the structure. Accordingly, the patch antennas 104, 108 are supported above the ground plane 112 by the support features 902, 922.

FIG. 9A illustrates four support features 922 on one side of the patch antenna 108 and four additional support features 922 on the other side of the patch antenna 108. Similarly, FIG. 9A illustrates four support features 902 on one side of the patch antenna 108 and four additional support features 902 on the other side of the patch antenna 108. However, shape, size, location and/or number of support features 902 and 922 illustrated in FIG. 9A are mere examples, and element 900 can include any different numbers, locations, shapes and/or sizes of the support features 902 and 922.

Note that in the cross-sectional view of FIG. 9B, only one support feature 922 on each side of the patch antenna 108 is visible, and similarly, only one support feature 902 on each side of the patch antenna 104 is visible. Furthermore, in FIG. 9B, the support features 902, 922 are schematically illustrated using thick lines for purposes of illustrative clarity, although the support features 902, 922 may have another appropriate shape.

Figure 9C:
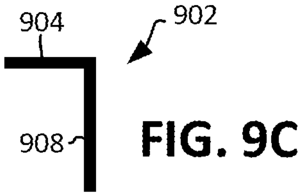
Figure 9D:
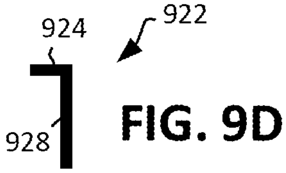

FIG. 9C illustrates a cross-sectional view of an example support feature 902 and FIG. 9D illustrates a cross-sectional view of an example support feature 922 in further detail. Referring to FIGS. 9B and 9D, the support feature 922 includes a component 928 extending vertically and orthogonally from above the ground plane 112, and another component 924 extending horizontally (e.g., parallel to the ground plane 112) from the component 928 to the patch antenna 108. Referring to FIGS. 9B and 9C, the support feature 902 includes a component 908 extending vertically from above the support feature 922 (e.g., from above the component 928 of the support feature 922), and another component 904 extending horizontally (e.g., parallel to the ground plane 112) from the component 908 to the patch antenna 104.

In an example, the components 908 and 928 may be considered to be a common component that extends vertically and orthogonally from above the ground plane 112, where the component 924 extends horizontally from this common component to the patch antenna 108, and where the component 904 extends horizontally from this common component to the patch antenna 104.

In one embodiment, individual sections of the component 900 (e.g., the ground plane 112, the patch antennas 104, and the support features 902, 922) comprises conductive material, such as one or more metals and/or alloys thereof. For example, individual sections of the component 900 may comprise copper. Thus, the additive manufacturing process deposits the conductive material, layer by layer, to additively manufacture the element 900, e.g., using a 3D printing process.

Note that in an example where the support features 902, 922 comprise a conductive material, the support features 902, 922 physically and electrically couples the ground plane 112, the patch antenna 104, and the patch antenna 108 to each other. However, in the final antenna system 100, there cannot be any such electrical coupling between the ground plane 112, the patch antenna 104, and the patch antenna 108. Accordingly, during later processes of the method 800 (such as during the process 812 of method 800), the entirety of the support features 902, 922 or at least parts thereof have to be removed, such that the support features 902, 922 may no longer electrically couple the ground plane 112, the patch antenna 104, and the patch antenna 108 to each other. Accordingly, as at least parts of the support features 902, 922 are to be later removed or sacrificed, the support features 902, 922 are also referred to herein as sacrificial support features 902, 922.

Thus, during the additive manufacturing process where all sections of the element 900 comprise conductive material, the support features 902, 922 are used to temporarily support the patch antennas 104, 108 above the ground plane. Later (e.g., after application of the dielectric material 120 that can support the patch antennas 104, 108) in the method 800, at least parts of the support features 902, 922 may be removed.

In an example, the entire element 900 is elementally and/or compositionally the same. Thus, in this example, the entire element 900 comprises same conductive material, such as same one or more metals (such as copper) and/or alloys thereof. Thus, the entire element 900 is compositionally and/or elementally the same.

Materials that are "compositionally different" or "compositionally distinct" as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper).

In another example, the material of the structures 902, 922 is elementally and/or compositionally different from the materials of the ground plane 112 and/or the patch antennas 104, 108. In such an example, it may be possible to later remove at least sections of the structures 902, 922 using, for example, a process that is selective to the material of the structures 902, 922. For example, a chemical solution that dissolves the structures 902, 922 (e.g., without substantially dissolving the materials of the ground plane 112 and/or the patch antennas 104, 108) may be used to wash away the structures 902, 922, without substantially removing the ground plane 112 and/or the patch antennas 104, 108.

In yet another example, the additive manufacturing process may support formation of the ground plane 112 and the patch antennas 104, 108 using conductive material, while allowing formation of the support features 902, 922 using non-conductive material. Thus, in such an example, the support features 902, 922 physically couple the ground plane 112 to each of the patch antennas 104, 108. However, because the support features 902, 922 comprise non-conductive material, the support features 902, 922 no longer electrically couple the ground plane 112 to any of the patch antennas 104, 108. Thus, in such an example, the support features 902, 922 need not be sacrificial in nature, and need not be removed later in the method 800. For some such example embodiments, the process 812 of method 800 discussed herein later may become optional, e.g., may be skipped.

FIGS. 9A and 9B illustrate the element 900 for a single antenna system 100. In contrast, FIG. 9E illustrates the element 900 formed for multiple such antenna systems 100, such as for the array 700 discussed with respect to FIGS. 7A-7E.

Figure 9E:
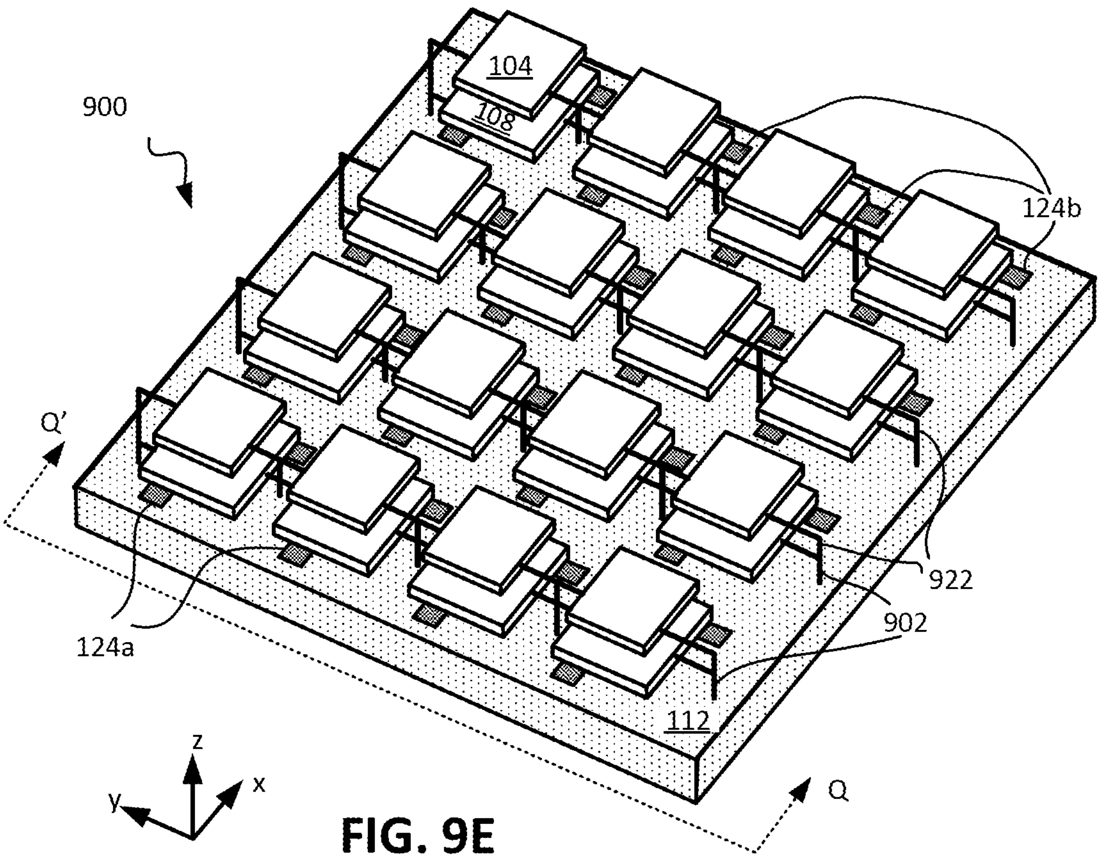

Referring to FIG. 9E, this is a perspective view of the element 900 in which the patch antennas 104, 108 are arranged in an array above the ground plane 112. Thus, the element 900 of FIG. 9E includes a plurality of lower patch antennas 108 arranged laterally in an array. For example, an upper (or lower) surface of each of the array of lower patch antennas 108 may be coplanar (e.g., belonging to a same horizontal plane). Similarly, the element 900 of FIG. 9E includes a plurality of upper patch antennas 104 arranged laterally in an array. For example, an upper (or lower) surface of each of the array of upper patch antennas 104 may be coplanar (e.g., belonging to a same horizontal plane). Each upper patch antenna 104 is above a corresponding lower patch antenna 108.

Also illustrated in FIG. 9E are the various support features 902, 922. Note that in FIG. 9E, the support features 902, 922 are schematically illustrated using thick lines for purposes of illustrative clarity, although the support features 902, 922 may have another appropriate shape. For example, a collection of four support structures 902 attached to a side of a given patch antenna 108 is schematically illustrated using a single thick line in FIG. 9E.

Figure 9F:
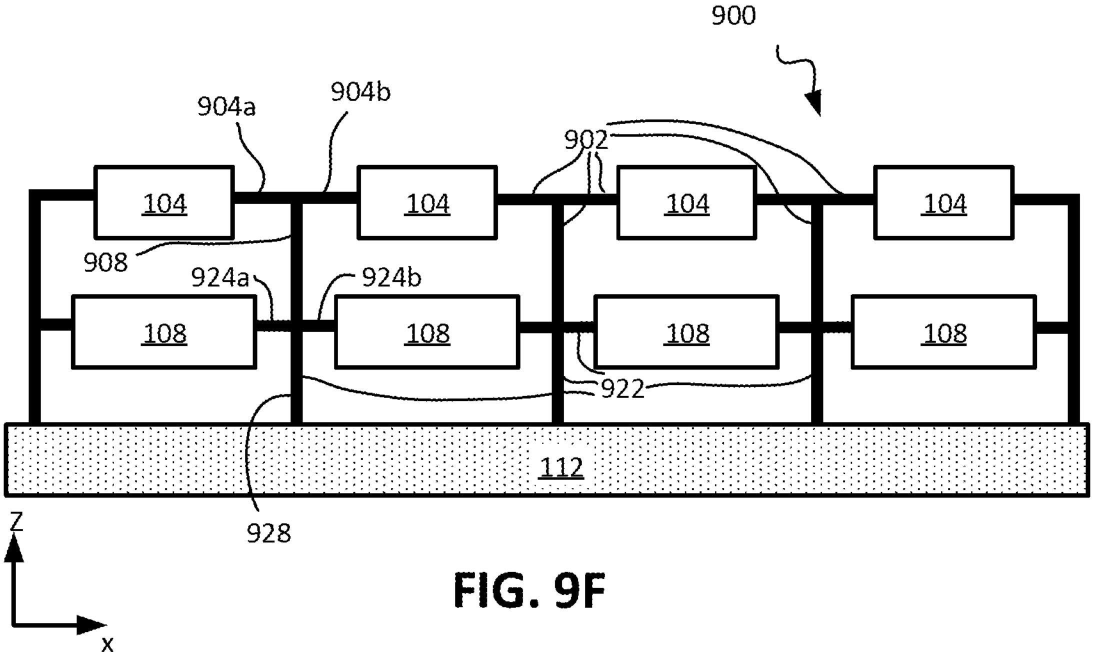

FIG. 9F illustrates a cross-sectional view of the element 900 of FIG. 9E. FIG. 9F illustrates the cross-sectional view along line Q-Q' of the perspective view of FIG. 9E. Referring to FIGS. 9E and 9F, two support features (e.g., supporting two laterally adjacent lower patch antennas or two laterally adjacent upper patch antennas) may have common components. Thus, referring to FIGS. 9D and 9F, a vertical component 928 is between two laterally adjacent lower patch antennas 108, and a horizontal component 924*a* extending from the vertical component 928 supports a first lower patch antenna 108 and another horizontal component 924*b* extending from the vertical component 928 supports a second lower patch antenna 108. Similarly, a vertical component 908 is between two laterally adjacent upper patch antennas 104, and a horizontal component 904*a* extending from the vertical component 908 supports a first upper patch antenna 104 and another horizontal component 904*b* extending from the vertical component 908 supports a second upper patch antenna 104, as illustrated in FIG. 9F.

Referring again to the method 800 of FIG. 8, the method 800 proceeds from 804 to 808. At 808, a dielectric material 120 is applied between the ground plane 112 and the patch antennas 104, 108. In an example, the dielectric material 120 at least in part supports the patch antennas 104, 108 above the ground plane 112.

Figure 10A:
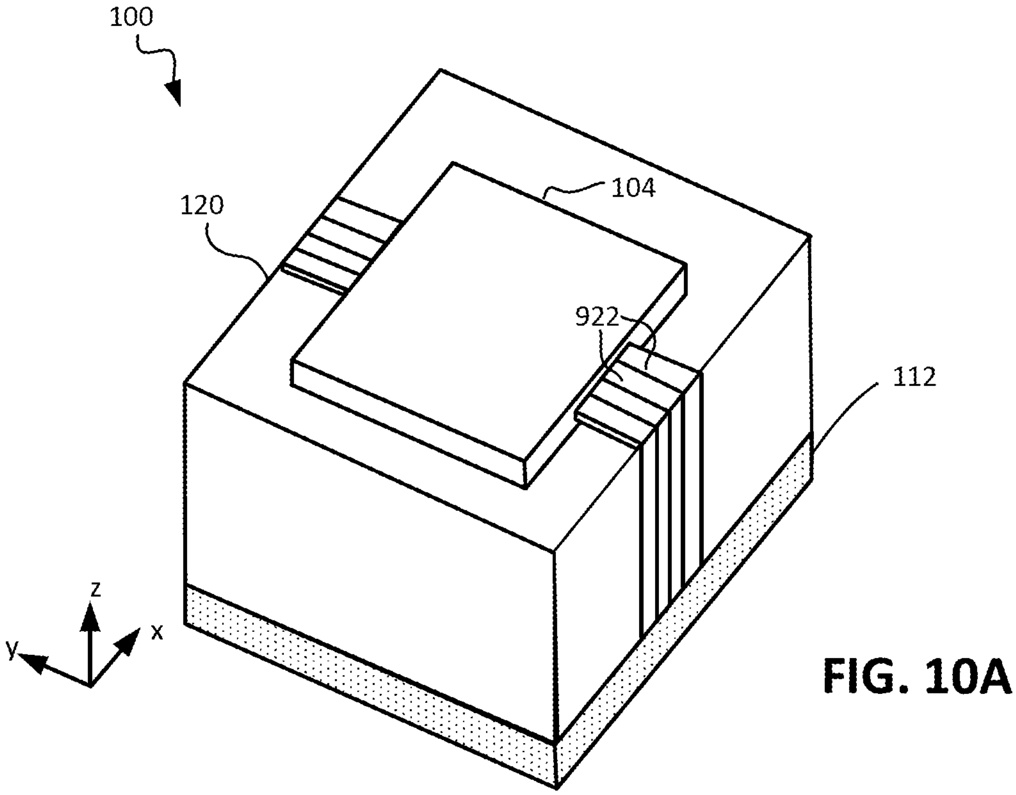
Figure 10B:
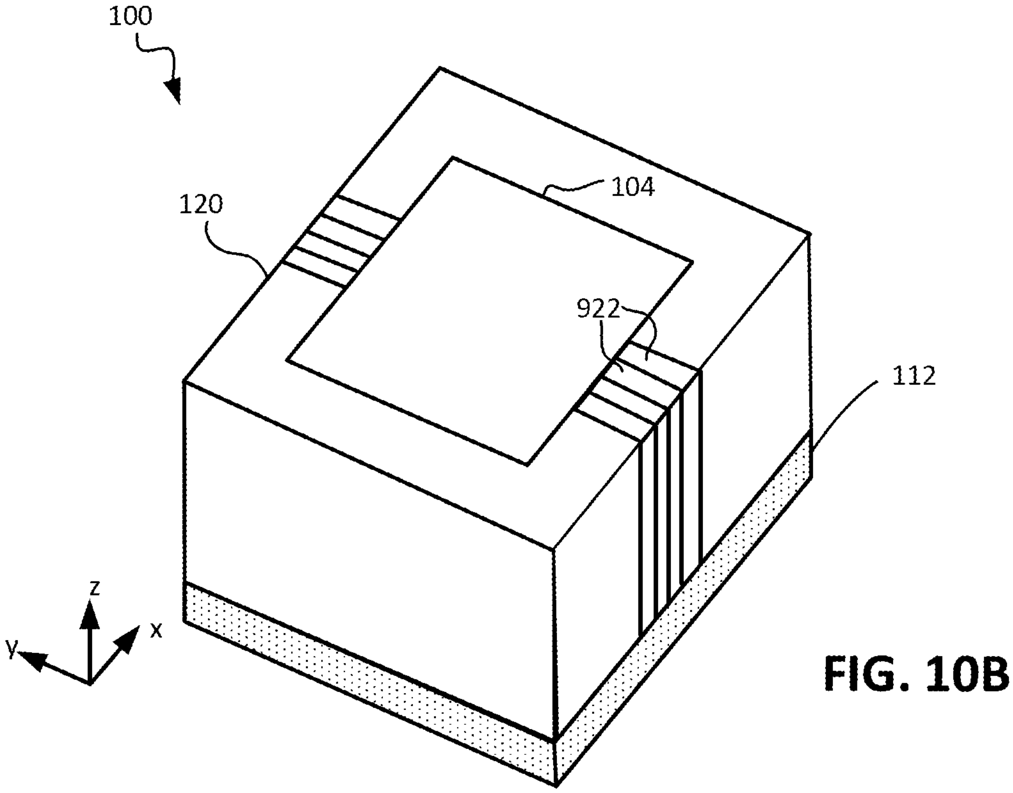
Figure 10C:
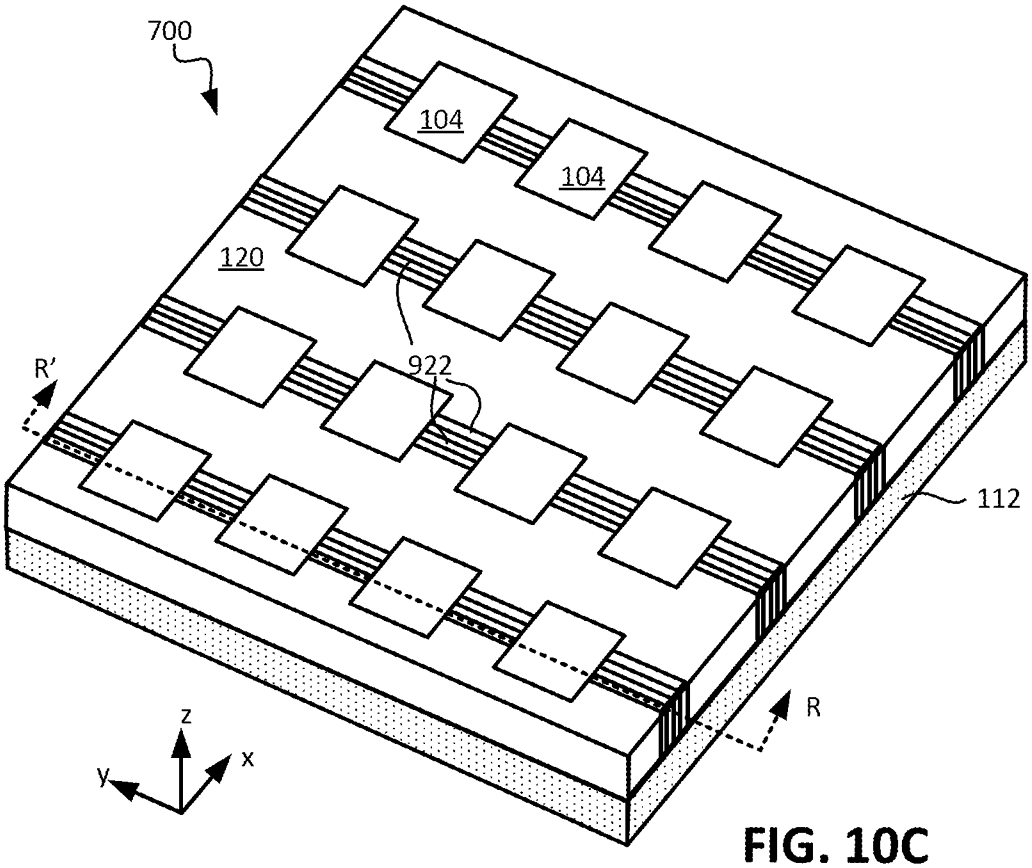
Figure 10D:
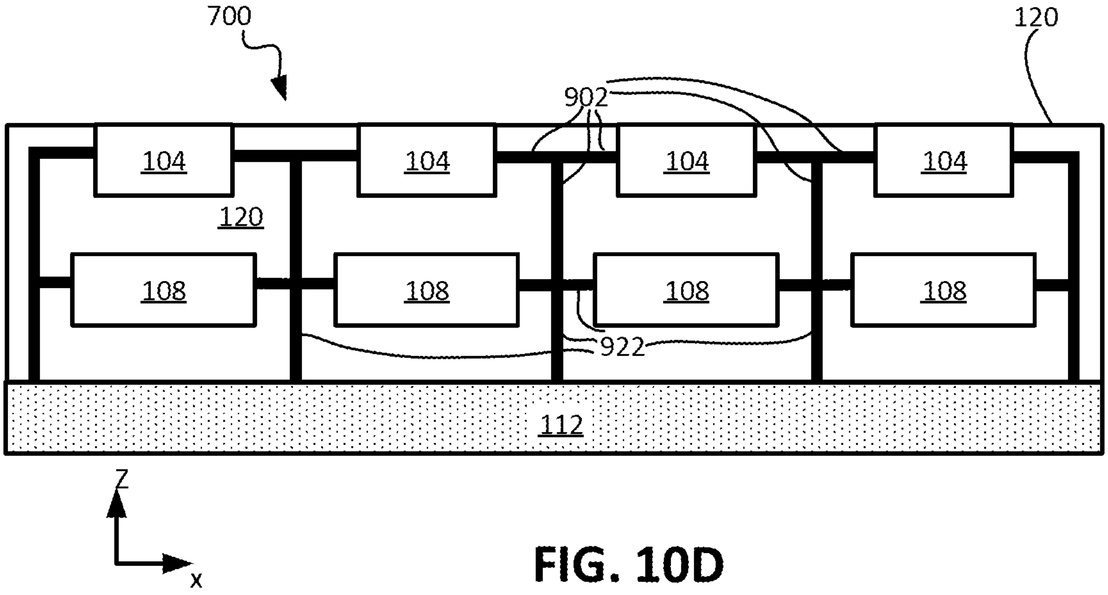

Each of FIGS. 10A and 10B illustrate perspective views of a single antenna system 100 after application of the dielectric material 120. FIG. 10C illustrates perspective view of the antenna array 700 including the array of the antenna systems 100, after application of the dielectric material 120. FIG. 10D illustrates a cross-sectional view of the array 700 along line R-R' of the perspective view of FIG. 10C.

In FIG. 10A, at least a section of the patch antenna 104 extends above the dielectric material 120, e.g., as discussed with respect to FIGS. 1D, 5C, and 7D. In contrast, in FIG. 10B, an upper surface of the patch antenna 104 and an upper surface of the dielectric material 120 are flush or coplanar, e.g., as also discussed with respect to FIGS. 5D and 7E. In an example, after applying the dielectric material 120, the dielectric material 120 may be planarized (e.g., using an appropriate polishing or machining operation), such that the upper surface of individual patch antennas 104 and the upper surface of the dielectric material 120 are flush or coplanar, as illustrated in FIG. 10B. In FIG. 10C as well, the upper surfaces of the various patch antennas 104 and an upper surface of the dielectric material 120 are flush or coplanar, e.g., similar to FIG. 10B.

In one embodiment, the dielectric material 120 is an appropriate type of foam. The dielectric foam 120 may be provided within the array 700 using any appropriate foaming technique. Merely as an example, during the foaming process, a mixture of an activator and a foaming portion may be deposited in the space between the ground plane 112 and the patch antennas 104, 108 of the element 900, and then the element 900 with the foaming mixture may be cured at an appropriate temperature, such that rigid foam forms from the activator and the foaming portion. In another example, a foaming gel or solution may be applied to the element 900 and then cured, such that rigid foam forms within the element 900. In yet another example, a foaming power (e.g., comprising microspheres including resins or another appropriate material) is applied to the element 900 and then cured at an appropriate temperature, such that the foaming power transforms to the rigid dielectric foam 120. Any appropriate foaming process can be used to form the dielectric foam 120, and the selection of the foaming process and/or the selection of an appropriate type of foam may be implementation specific.

As illustrated in FIGS. 10A-10D, in an example, at least a section of the upper surface of the ground plane 112 and the lower patch antennas 108 are encapsulated by the dielectric foam 120. For example, the dielectric foam 120 fully encapsulates the lower patch antennas 108 within the array 700.

In an example, the dielectric foam 120 may also cover the upper surface of the upper patch antennas 104. In some such examples, the top surface of the dielectric foam 120 may be polished or machined, e.g., such that at least the upper surface of the upper patch antennas 104 are exposed through the dielectric foam 120, as illustrated in FIGS. 10B and 10C. However, although not illustrated in FIGS. 10-10D and discussed with respect to FIG. 5E, in another example, the dielectric foam 120 may cover the upper surface of the upper patch antennas 104 (e.g., the dielectric foam 120 may form an overlay or radome for the antenna array 700).

Thus, after application of the dielectric material 120, the dielectric material 120 can now support the patch antennas 104, 108 above the ground plane 112. Accordingly, at this stage of method 800, the support features 102, 122 can be at least in part or in its entirety removed.

Referring again to the method 800 of FIG. 8, the method 800 then proceeds from 808 to 812. At 812, at least sections of the sacrificial support features 902, 922 are removed. Also, optionally, further dielectric material 120 may be applied to voids created by removal of the at least sections of the sacrificial support features 902, 922.

In an example where the sacrificial support features 902, 922 comprise conductive material, removing at least sections of the sacrificial support features 902, 922 breaks the electrical path between the ground plane 112 and the patch antennas 104, 108 through the support features 902, 922, as intended in the final antenna system 100 and the antenna array 700.

Figure 11A:
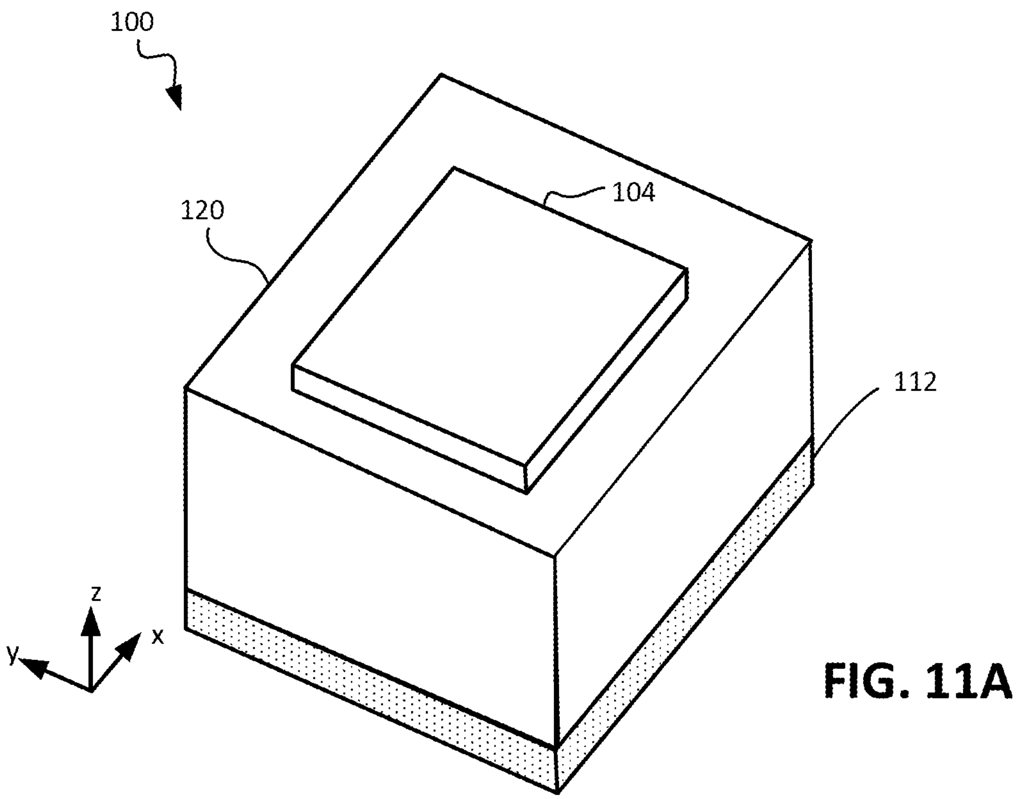
Figure 11B:
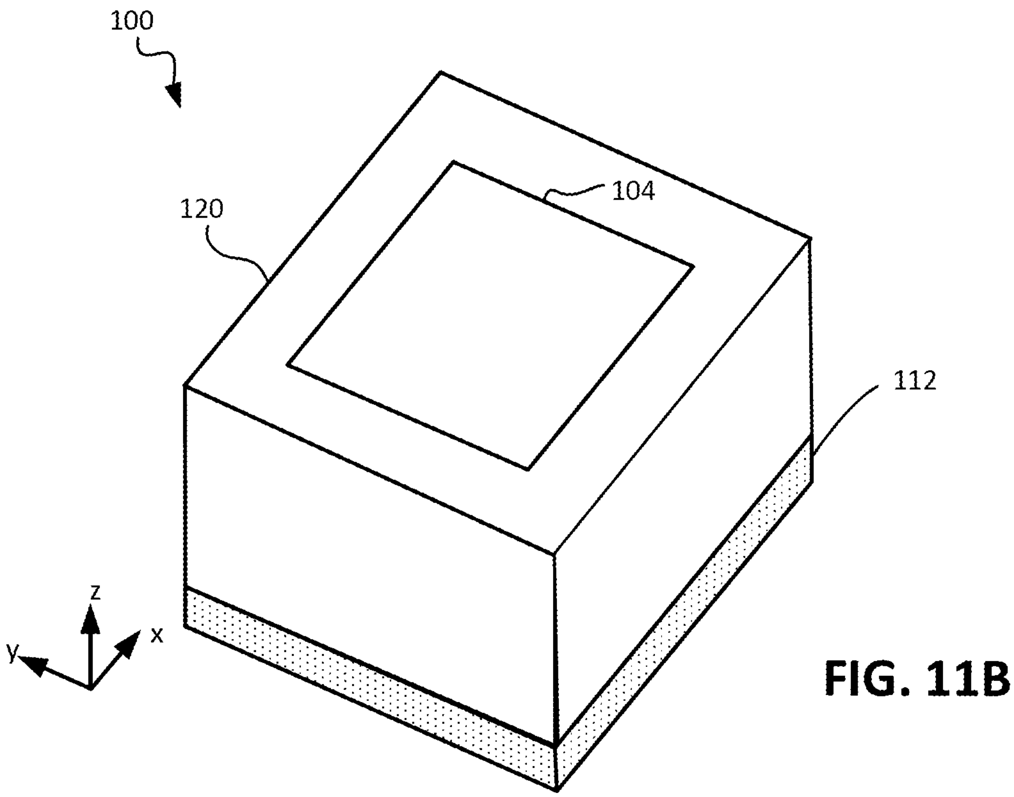
Figure 11C:
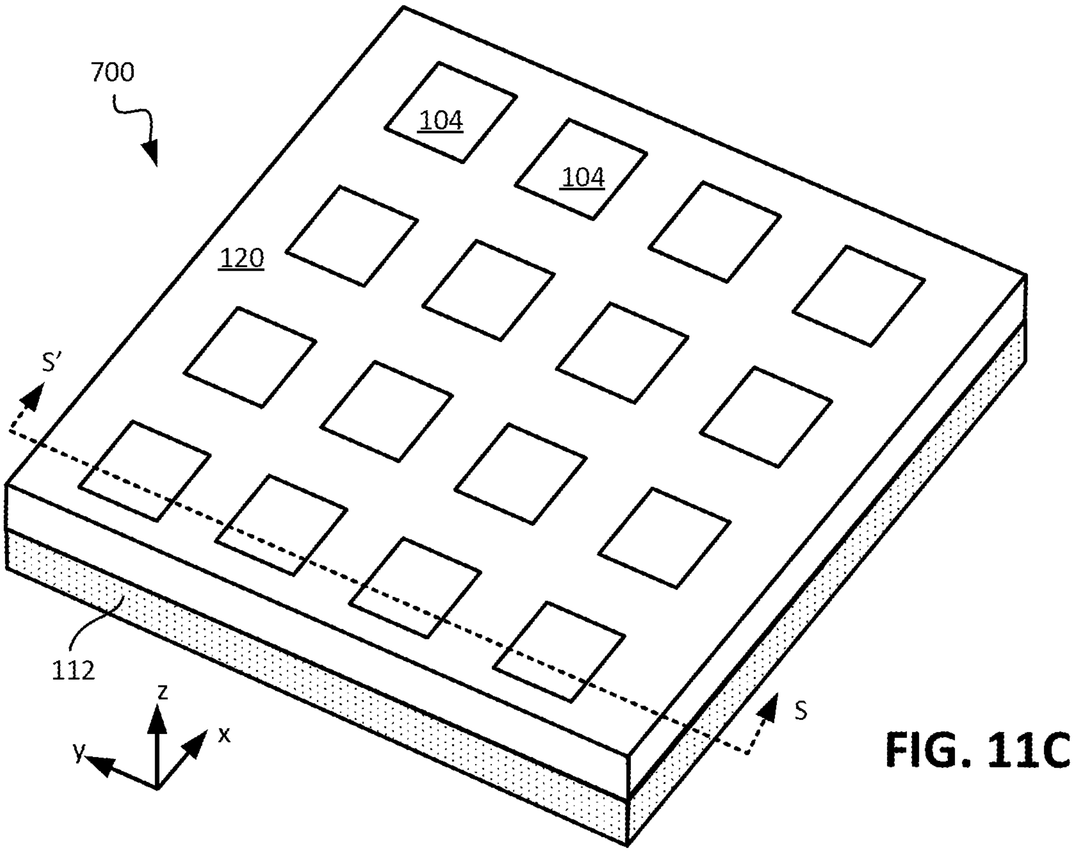

FIGS. 11A and 11B illustrate perspective views of the antenna system 100 and FIG. 11C illustrates perspective view of the antenna array 700, after removal of at least sections of the support features 902, 922. Thus, the support features 922 are not visible in the view of FIGS. 11A, 11B, 11C. Similar to FIG. 10A, in FIG. 11A the patch antenna 104 is at least in part above the dielectric foam 120. Similar to FIGS. 10B and 10C, in FIGS. 11B and 11C the upper surface of the patch antenna 104 and the dielectric foam 120 are coplanar.

Figure 11D:
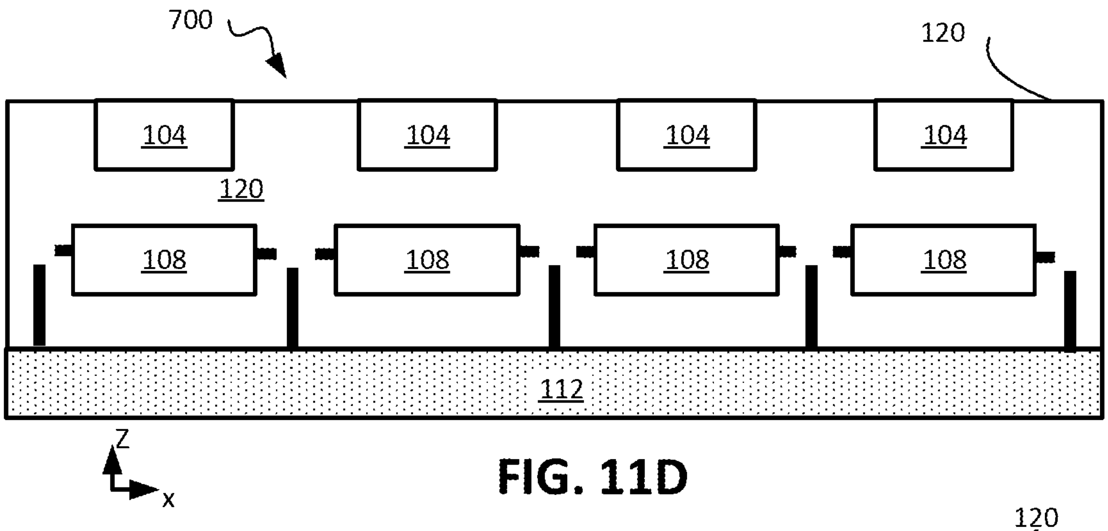
Figure 11E:
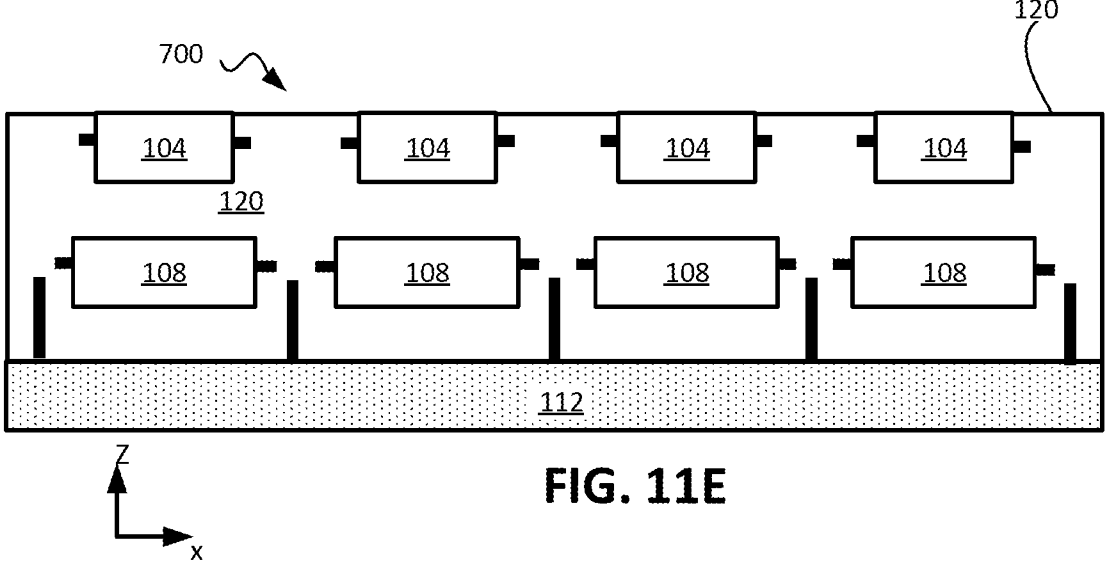
Figure 11F:
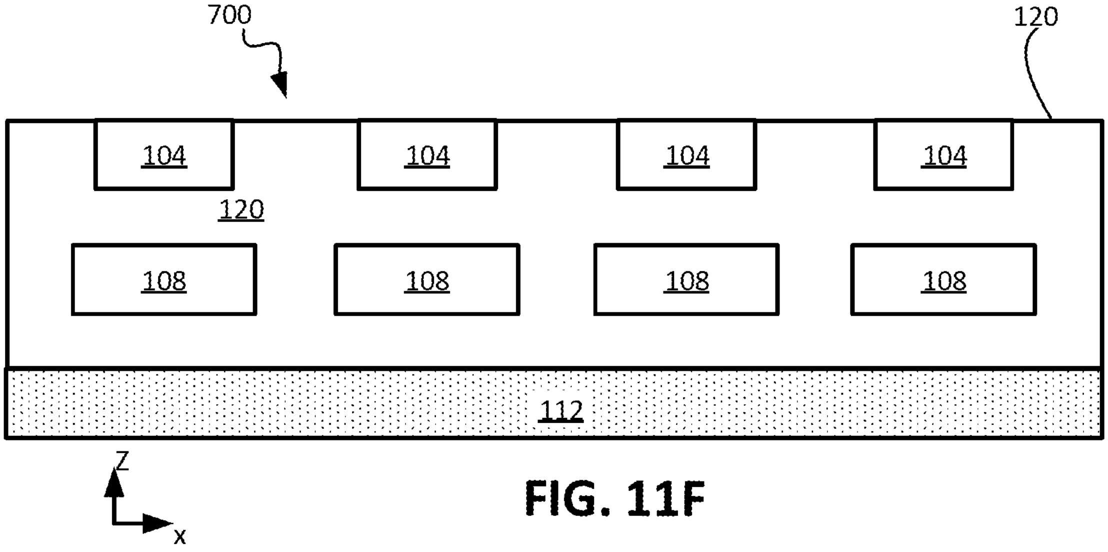

FIGS. 11D-11F illustrate example cross-sectional views of the array 700 along line S-S' of the perspective view of FIG. 11C. For example, in FIGS. 11D and 11E, various corresponding sections of the support features 902, 922 have been removed, and in FIG. 11F entirety of the support features 902, 922 have been removed. In each of FIGS. 11D-11E, remnants of the support features still remain, but the remnants of the support features 102, 122 does not provide any physical or electrical coupling between any of the ground plane 112, the upper patch antennas 104 and the lower patch antennas 108 through the conductive support features 102, 122.

Although FIGS. 11D and 11E illustrate removal of example sections of the support features 102, 122, in other examples, other sections of the support features 102, 122 may instead (or in addition to) be removed, as long as such removal breaks the electrical coupling between any of the ground plane 112, the upper patch antennas 104 and the lower patch antennas 108 through remnants of the conductive support features 102, 122.

Removal of at least sections of the sacrificial support features 902, 922 may be performed using any appropriate removal process, e.g., depending on the material of the support features 902, 922 and/or may be implementation specific. In an example, the support features 902, 922 may be machined or drilled away through the dielectric foam 120. In another example where the material of the support features 902, 922 are different from the materials of the ground plane 112 and the patch antennas 104, 108, at least sections of the sacrificial support features 902, 922 may be dissolved using a chemical solution that selectively dissolves the material of the sacrificial support feature, e.g., without substantially dissolving the materials of the ground plane 112 and the patch antennas 104, 108.

In one embodiment, voids formed by removal of at least sections of the sacrificial support features 902, 922 may be filled again with further application of the dielectric foam 120 within the voids (e.g., similar to the application process discussed with respect to 808 of the method 800). In another embodiment, the voids may be left as is, and may not be filed with any further dielectric foam 120.

As previously discussed herein, in an example, the additive manufacturing process of 804 may support formation of the ground plane 112 and the patch antennas 104, 108 using conductive material, while allowing formation of the support features 902, 922 using non-conductive material. Thus, in such an example, the support features 902, 922 physically couple the ground plane 112 to each of the patch antennas 104, 108. However, because the support features 902, 922 comprise non-conductive material, the support features 902, 922 doesn't electrically couple the ground plane 112 to any of the patch antennas 104, 108. Thus, in such an example, the support features 902, 922 need not be sacrificial in nature, and need not be removed later in the method 800. In such an example, the process 812 may be optional, and may be skipped in an example.

Referring again to the method 800 of FIG. 8, the method 800 then proceeds from 812 to 816. At 816, the ground plane 112 (with the patch antennas 104, 108 and the dielectric foam 120 there above) to a layer of dielectric material 116.

Figure 12A:
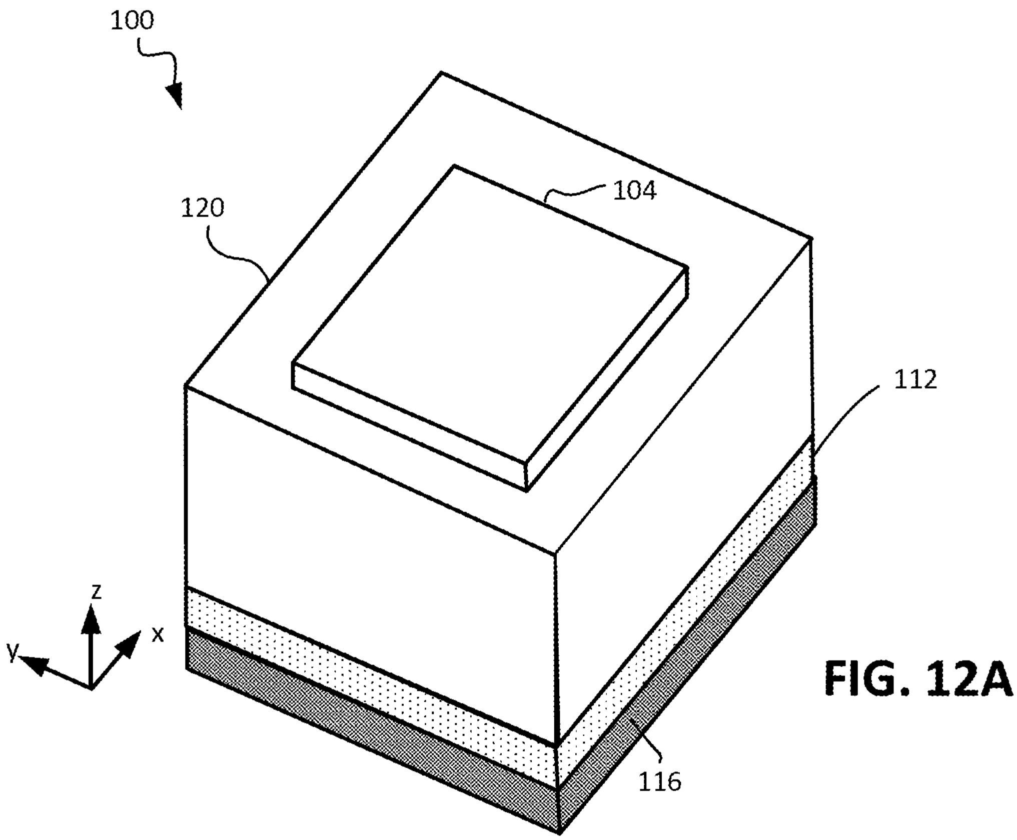
Figure 12B:
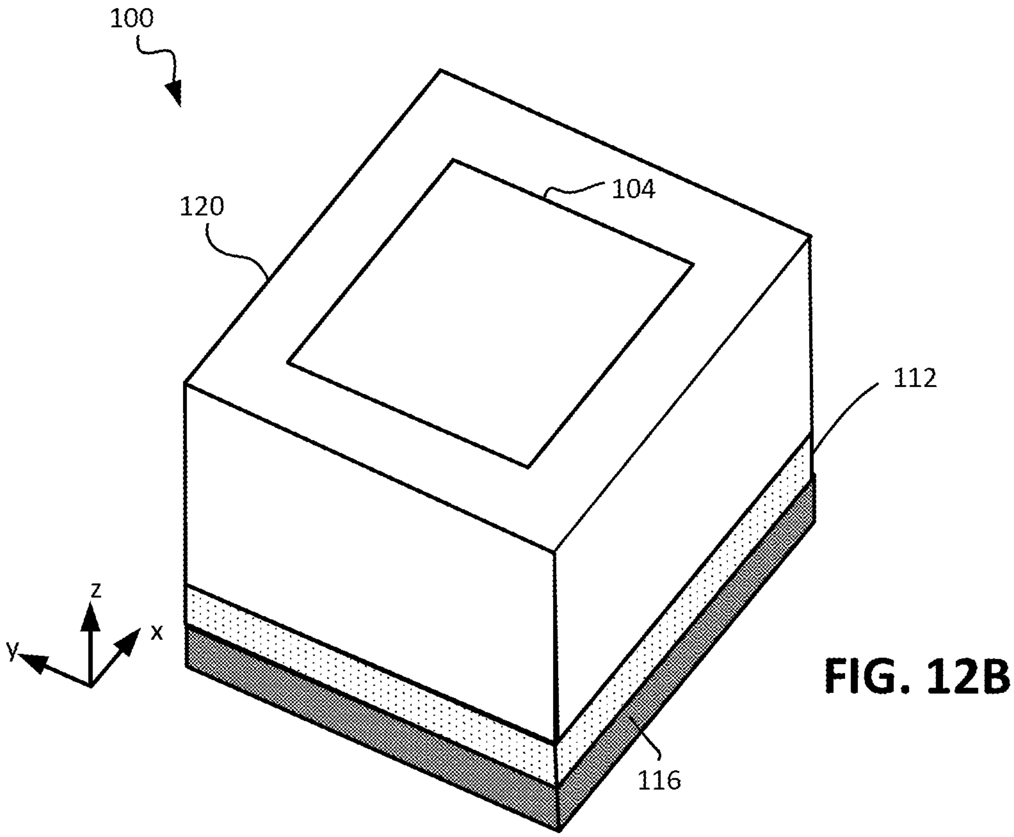
Figure 12C:
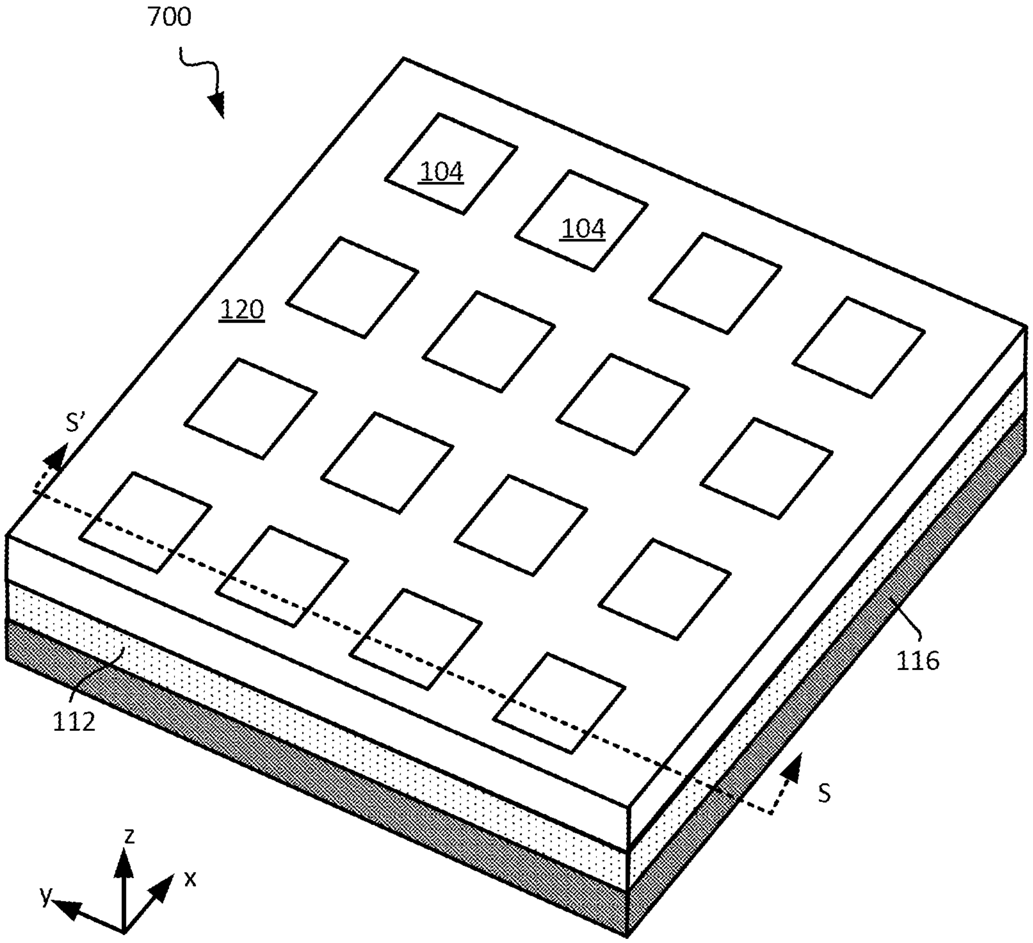

FIGS. 12A and 12B illustrate perspective views of the antenna system 100 and FIG. 12C illustrates perspective view of the antenna array 700, after attachment of the layer of dielectric material 116 to the ground plane 112. Similar to FIG. 10A, in FIG. 12A the patch antenna 104 is at least in part above the dielectric foam 120. Similar to FIGS. 10B and 10C, in FIGS. 12B and 12C the upper surfaces of the patch antennas 104 and the dielectric foam 120 are coplanar.

In an example, the feed lines 130*a* and 130*b* are attached to a lower surface of the layer of dielectric material 116, e.g., prior to (or subsequent to) the dielectric material 116 being attached to the ground plane 112 (although the feed lines 130*a* and 130*b* are not visible in the perspective views of FIGS. 12A-12C). In an example, the layer of dielectric material 116 is attached to a lower surface of the ground plane 112 using, for example, an appropriate adhesive (e.g., see adhesive layer 117 of FIG. 1D1). Thus, FIGS. 12A-12B illustrate example structure of the antenna system 100 and FIG. 12C illustrates example structure of the antenna array 700. Although not illustrated, in an example, a radome or an overlay material may be provided above the patch antennas 104 and/or the dielectric material 120.

Figure 12D:
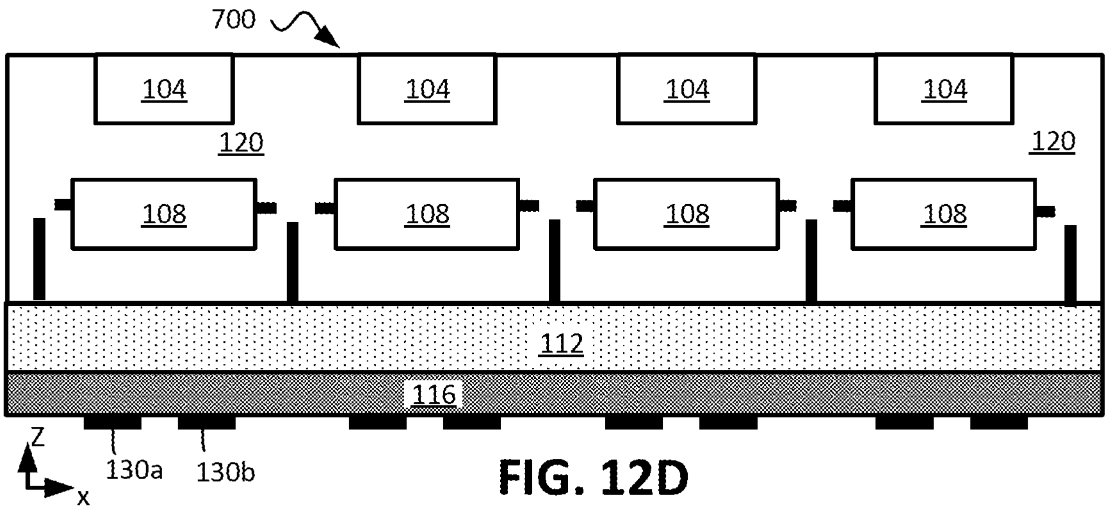
Figure 12E:
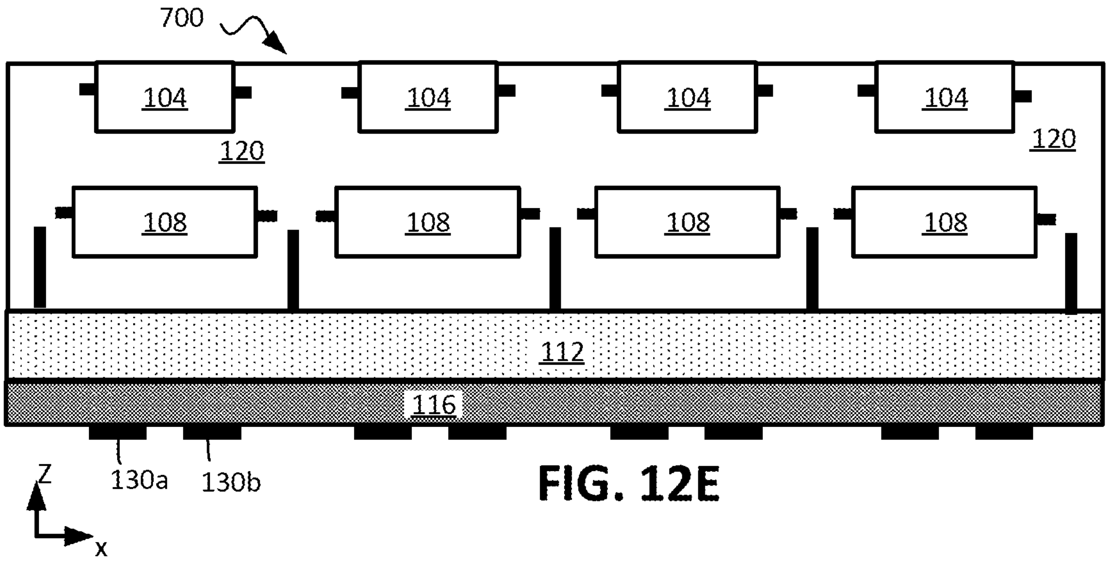
Figure 12F:
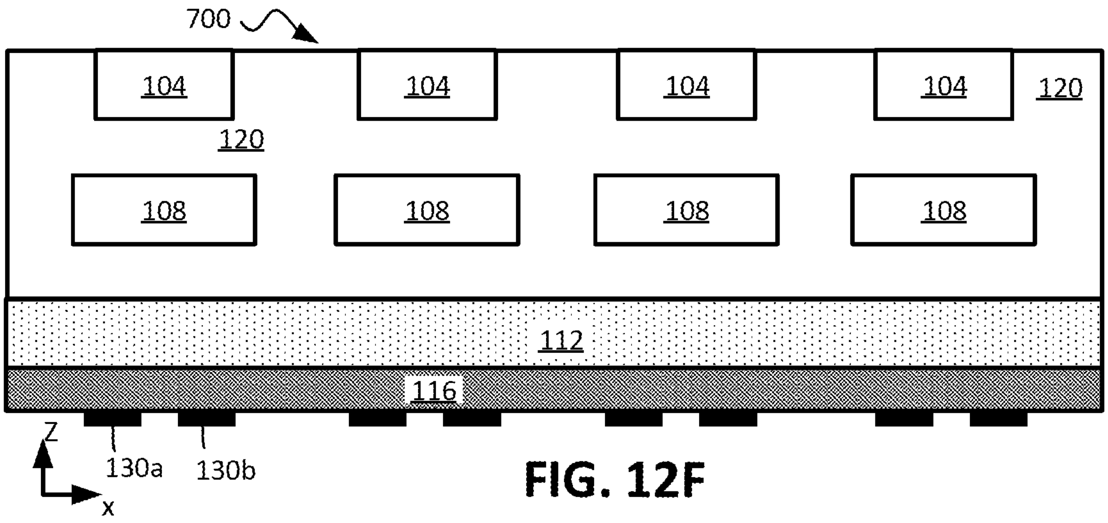

FIGS. 12C, 12D, 12E illustrate example cross-sectional views of the array 700 along line S-S' of the perspective view of FIG. 12C. For example, in FIGS. 12D and 12E, various corresponding sections of the support features 902, 922 have been removed (e.g., similar to FIGS. 11D and 11E, respectively), and in FIG. 12F entirety of the support features 902, 922 have been removed (e.g., similar to FIGS. 11D and 11E, respectively). FIGS. 12C, 12D, 12F also illustrate the layer of dielectric material 116 below the ground plane 112, and the feed lines 130*a*, 130*b* below each corresponding patch antenna 108. As seen in FIGS. 12D and 12E, remnants of the support features 102, 122 may be present in the final antenna system 100 and the final antenna array 700, in some examples. On the other hand, in the example of FIG. 12F, no such remnants of the support features 102, 122 may be present in the final antenna system 100 and the final antenna array 700.

FURTHER EXAMPLE EXAMPLES

The following examples pertain to further examples, from which numerous permutations and configurations will be apparent.

Example Set 1

Example 1. An antenna assembly comprising: a ground plane having a first aperture slot and a second aperture slot, wherein the first aperture slot and the second aperture slot are non-intersecting and substantially symmetrical with each other about an imaginary plane of symmetry that divides the ground plane into two substantially symmetrical halves, the imaginary plane orthogonal to the ground plane; and a first patch antenna above the ground plane, and a second patch antenna above the first patch antenna, wherein the first patch antenna is separated from the ground plane, and the second patch antenna is separated from the first patch antenna.

Example 2. The antenna assembly of example 1, wherein: the first aperture slot has (i) a first side that faces a first side of the ground plane, and (ii) a second side that faces a second side of the ground plane, the first side of the first aperture slot is opposite the second side of the first aperture slot, and the first side of the ground plane is opposite the second side of the ground plane; and a length of the first side of the first aperture slot is greater than a length of the second side of the first aperture slot by at least 0.02λ, where λ is the signal wavelength.

Example 3. The antenna assembly of example 2, wherein: the first aperture slot further has (i) a third side that faces a third side of the ground plane, and (ii) a fourth side that faces a fourth side of the ground plane, wherein the third side of the first aperture slot is substantially parallel to the third side of the ground plane, and wherein the fourth side of the first aperture slot is not parallel to the fourth side of the ground plane.

Example 4. The antenna assembly of example 3, wherein: the first side of the aperture slot is substantially parallel to and at a first distance from the first side of the ground plane; the third side of the aperture slot is substantially parallel to and at a second distance from the third side of the ground plane; and the first distance is greater than the second distance by at least 0.02λ, where λ is the signal wavelength.

Example 5. The antenna assembly of any one of examples 3-4, wherein the fourth side is non-linear.

Example 6. The antenna assembly of any one of examples 3-5, wherein an angle between the fourth side and the first side is less than 88 degrees, and an angle between the fourth side and the second side is more than 92 degrees.

Example 7. The antenna assembly of any one of examples 3-6, wherein: the ground plane has an outer perimeter defined by a first corner, a second corner, a third corner that is opposite the first corner, and a fourth corner that opposite the second corner; an internal corner of the ground plane defined by the first side and the fourth side of the first aperture slot is nearer to the first corner of the ground plane than it is to the second, third and fourth corners; and the imaginary plane passes through the first and third corners of the ground plane.

Example 8. The antenna assembly of any one of examples 1-7, wherein the imaginary plane divides each of the first patch antenna and the second patch antenna into corresponding substantially symmetrical halves.

Example 9. The antenna assembly of any one of examples 1-8, wherein: the first patch antenna has a corresponding surface facing the ground plane; the second patch antenna has a corresponding surface facing the first patch antenna; the surface of the first patch antenna has a side having a first length; the surface of the second patch antenna has a side having a second length; and the first length and the second length differ by at least 0.04λ, where λ is the signal wavelength.

Example 10. The antenna assembly of example 9, wherein the surface of the first patch antenna has one of a square shape, a rhombus shape, or a circular shape, and the surface of the second patch antenna has one of a square shape, a rhombus shape, or a circular shape.

Example 11. The antenna assembly of any one of examples 1-10, further comprising: a first feed line at least in part below the first aperture slot, and a second feed line at least in part below the second aperture slot, wherein the first and second feed lines are symmetrical with each other about the imaginary plane.

Example 12. The antenna assembly of example 11, wherein the first feed line comprises: a first section that is below the first aperture slot; a second section that is perpendicular to the first section and on a first side of the first section, at least a part of the second section is not below the first aperture slot; and a third section that is perpendicular to the first section and on a second side of the first section that is opposite the first side, wherein a first part of the third section is below the first aperture slot and a second part of the third section is not below the first aperture slot.

Example 13. The antenna assembly of any one of examples 11-12, further comprising dielectric fill material between (i) the first and second feed lines and (ii) the ground plane.

Example 14. The antenna assembly of any one of examples 1-12, wherein a surface of the ground plane, which faces the first and second patch antennas, is substantially a square, with a side of the surface of the ground plane having a length that is at most 0.5λ, where λ is the signal wavelength.

Example 15. The antenna assembly of any one of examples 1-14, wherein the antenna assembly is configured to provide a bandwidth ratio of at least 2:1.

Example 16. The antenna assembly of any one of examples 1-15, wherein the first patch antenna is a first lower patch antenna, the second patch antenna is a first upper patch antenna, and wherein the antenna assembly further comprises: a second lower patch antenna above the ground plane and coplanar with the first lower patch antenna; and a second upper patch antenna above the second lower patch antenna and coplanar with the first upper patch antenna; wherein the first aperture slot and the second aperture slot of the ground plane are below the first lower patch antenna, and wherein the ground plane further comprises a third aperture slot and a fourth aperture slot that are below the second lower patch antenna.

Example 17. An antenna assembly comprising: a first feed line and a second feed line that are symmetrical with each other about an imaginary plane of symmetry; a ground plane having (i) a first aperture slot that is above at least a part of the first feed line and (ii) a second aperture slot that is above at least a part of the second feed line, wherein the first aperture slot and the second aperture slot are non-intersecting; and one or more patch antennas above the ground plane and separated from the ground plane.

Example 18. The antenna assembly of example 17, wherein the plane of symmetry is orthogonal to the ground plane.

Example 19. The antenna assembly of any one of examples 17-18, wherein the first aperture slot and the second aperture slot are symmetrical with each other about the plane of symmetry.

Example 20. The antenna assembly of any one of examples 17-19, wherein the one or more patch antennas comprise: a first patch antenna above the ground plane; and a second patch antenna above the first patch antenna, wherein the first patch antenna and the second patch antenna have the same shape but different sizes.

Example 21. An antenna array comprising a plurality of antenna structures, the antenna array comprising: a ground plane common to the plurality of antenna structures, the ground plane having, for each antenna structure of the plurality of antenna structures, a corresponding first aperture slot and a corresponding second aperture slot that are non-intersection and symmetrical to each other about a corresponding plane of symmetry, such that the ground plane comprises a plurality of first aperture slots and plurality of second aperture slots; wherein each antenna structure of the plurality of antenna structures comprises (i) a corresponding lower patch antenna that is above the corresponding first and second aperture slots of the ground plane, and (ii) an upper patch antenna above the lower patch antenna, such that the antenna array comprises a plurality of lower patch antennas and a plurality of upper patch antennas.

Example 22. The antenna array of example 21, wherein each antenna structure of the plurality of antenna structures further comprises: a corresponding first feed line at least in part below the corresponding first aperture slot of the corresponding antenna structure, and a corresponding second feed line at least in part below the corresponding second aperture slot of the corresponding antenna structure, such that the antenna array comprises a plurality of first feed lines and a plurality of second feed lines; wherein for a given antenna structure of the plurality of antenna structures, the corresponding first feed line and the corresponding second feed line are symmetrical to each other about the corresponding plane of symmetry.

Example Set 2

Example 1. An antenna assembly comprising: a first dielectric material; a ground plane above the first dielectric material, the ground plane having a first aperture slot, and a second aperture slot that is non-intersecting with the first aperture slot; two or more patch antennas above the ground plane; and a second dielectric material separating the two or more patch antennas from the ground plane.

Example 2. The antenna assembly of example 1, wherein the two or more patch antennas comprise (i) a first patch antenna above the ground plane, and (ii) a second patch antenna above the first patch antenna, wherein the second dielectric material further separates the first patch antenna from the second patch antenna.

Example 3. The antenna assembly of any one of examples 1-2, wherein the second dielectric material comprises dielectric foam.

Example 4. The antenna assembly of any one of examples 1-3, wherein the second dielectric material has a dielectric constant that is lower than a dielectric constant of the first dielectric material.

Example 5. The antenna assembly of any one of examples 1-4, wherein the second dielectric material has a dielectric constant that is less than 2.0.

Example 6. The antenna assembly of any one of examples 1-5, wherein the first dielectric material comprises a printed circuit board (PCB).

Example 7. The antenna assembly of any one of examples 1-6, wherein the first aperture slot and the second aperture slot are substantially symmetrical with each other about an imaginary plane of symmetry that divides the ground plane into two substantially symmetrical halves, the imaginary plane orthogonal to the ground plane.

Example 8. The antenna assembly of example 7, further comprising: a first feed line at least in part below the first aperture slot, and a second feed line at least in part below the second aperture slot, wherein the first and second feed lines are symmetrical with each other about the imaginary plane.

Example 9. The antenna assembly of example 8, wherein the first dielectric material is between the ground plane and the first and second feed lines.

Example 10. The antenna assembly of any one of examples 7-9, wherein the two or more patch antennas comprise (i) a first patch antenna above the ground plane, and (ii) a second patch antenna above the first patch antenna, and wherein the imaginary plane divides each of the first patch antenna and the second patch antenna into corresponding substantially symmetrical halves.

Example 11. The antenna assembly of any one of examples 1-10, wherein the two or more patch antennas comprise (i) a first lower patch antenna above the ground plane, and (ii) a first upper patch antenna above the first lower patch antenna, wherein the first and second aperture slots are at least in part below the first lower patch antenna, and wherein the antenna assembly further comprises: a second lower patch antenna above the ground plane, and a second upper patch antenna above the second lower patch antenna, wherein the first and second lower patch antennas are coplanar, and wherein the first and second upper patch antennas are coplanar; wherein the ground plane further comprises a third aperture slot, and a fourth aperture slot that is non-intersection with the third aperture slot, wherein the third and fourth aperture slots are below the second lower patch antenna.

Example 12. The antenna assembly of example 11, wherein the second dielectric material separates the first lower patch antenna, the first upper patch antenna, the second lower patch antenna, the second upper patch antenna, and the ground plane from each other.

Example 13. The antenna assembly of any one of examples 1-12, wherein antenna assembly has a bandwidth ratio of at least 2:1.

Example 14. An antenna array comprising a plurality of antenna structures, the antenna array comprising: a ground plane comprising conductive material and having a plurality of aperture slots; a first dielectric material above the ground plane; and a second dielectric material below the ground plane; wherein each of the plurality of antenna structures comprises (i) a corresponding lower patch antenna above the ground plane and a corresponding upper patch antenna above the corresponding lower patch antenna, such that the antenna array comprises a plurality of lower patch antennas and a plurality of upper patch antennas, and (ii) one or more corresponding feed lines below the second dielectric material and the corresponding lower patch antenna, such that the antenna array comprises a plurality of feed lines; and wherein within each of the plurality of antenna structures, the first dielectric material separates the ground plane from the corresponding lower and upper patch antennas.

Example 15. The antenna array of example 14, wherein the first dielectric material comprises dielectric foam and the second dielectric material comprises a printed circuit board.

Example 16. The antenna array of any one of examples 14-15, wherein within each of the plurality of antenna structures, one or more corresponding aperture slots of the ground plane are below the corresponding lower patch antenna.

Example 17. The antenna array of any one of examples 14-16, wherein: the plurality of feed lines comprises, for each of the plurality of antenna structures, a corresponding first feed line and a corresponding second feed line below the second dielectric material and the corresponding lower patch antenna; and plurality of aperture slots of the ground plane comprises, for each of the plurality of antenna structures, a corresponding first aperture slot that is at least in part above the corresponding first feed line and a corresponding second aperture slot that is at least in part above the corresponding second feed line.

Example 18. An antenna assembly comprising: a ground plane having a first aperture slot and a second aperture slot that are substantially symmetrical with each other about an imaginary plane of symmetry, the plane of symmetry orthogonal to the ground plane; two or more patch antennas above the ground plane; a first feed line at least in part below the first aperture slot, and a second feed line at least in part below the second aperture slot, wherein the first and second feed lines are symmetrical with each other about the plane of symmetry; and a dielectric foam material separating the ground plane from the two or more patch antennas.

Example 19. The antenna assembly of example 18, wherein the two or more patch antennas comprise (i) a first patch antenna above the ground plane, and (ii) a second patch antenna above the first patch antenna, wherein the dielectric foam material separates the first patch antenna from the second patch antenna.

Example 20. The antenna assembly of example 19, wherein the dielectric foam material encapsulates the first patch antenna, and is at least in part below the second patch antenna, such that the first and second patch antennas are supported above the ground plane by the dielectric foam material.

Example 21. The antenna assembly of any one of examples 19-20, wherein the second patch antenna at least in part extends within the dielectric foam material, such that a top surface of the dielectric foam material and a top surface of the second patch antenna are coplanar.

Example Set 3

Example 1. A method of manufacturing an antenna assembly, the method comprising: additively manufacturing an element that is a monolithic structure and that includes (i) a ground plane comprising one or more aperture slots, (ii) a patch antenna above the ground plane, and (iii) a sacrificial support feature to support the patch antenna above the ground plane; applying a dielectric material between the ground plane and the patch antenna; and removing at least a section of the sacrificial support feature.

Example 2. The method of example 1, wherein applying the dielectric material between the ground plane and the patch antenna comprises: providing a dielectric foam between the ground plane and the patch antenna, the dielectric foam at least in part supporting the patch antenna above the ground plane.

Example 3. The method of any one of examples 1-2, wherein additively manufacturing the element comprises printing the element using a three-dimensional (3D) printer.

Example 4. The method of any one of examples 1-3, wherein the dielectric material is a first dielectric material, wherein the ground plane comprises a first surface facing the first dielectric material and the patch antenna, and an opposing second surface, and wherein the method further comprises: subsequent to applying the first dielectric material, attaching the second surface of the ground plane to a layer of second dielectric material.

Example 5. The method of example 4, wherein the layer of second dielectric material comprises a first surface and an opposing second surface, and wherein the method further comprises: providing the layer of second dielectric material having the first surface attached to one or more feed lines; wherein attaching the second surface of the ground plane to the layer of second dielectric material comprises attaching the second surface of the ground plane to the second surface of the layer of second dielectric material.

Example 6. The method of any one of examples 4-5, wherein the layer of second dielectric material comprises a printed circuit board (PCB).

Example 7. The method of any one of examples 1-6, wherein the ground plane, the patch antenna, and the support feature comprise conductive material.

Example 8. The method of any one of examples 1-7, wherein the ground plane, the patch antenna, and the support feature comprise a metal.

Example 9. The method of any one of examples 1-8, wherein removing at least the section of the sacrificial support feature comprises: removing at least the section of the sacrificial support feature, such that any remnant sacrificial support feature no longer physically couples the ground plane to the patch antenna.

Example 10. The method of any one of examples 1-9, wherein the sacrificial support feature comprises a first component extending orthogonally above the ground plane, and a second component extending from the first component to the patch antenna.

Example 11. The method of any one of examples 1-10, wherein the patch antenna is a first patch antenna, wherein the sacrificial support feature is a first sacrificial support feature, and wherein the element further includes (i) a second patch antenna above the first patch antenna, and (ii) a second sacrificial support feature to support the second patch antenna above the first patch antenna and the ground plane.

Example 12. The method of example 11, wherein the first and second sacrificial support features comprise conductive material that physically couples the ground plane with each of the first and second patch antennas, and wherein the method further comprises: removing at least the section of the second sacrificial support feature, such that any remnant of the first and second sacrificial support features no longer physically couples the ground plane to any of the first or second patch antennas, and no longer physically couples the first patch antenna to the second patch antenna.

Example 13. The method of any one of examples 11-12, wherein: the first sacrificial support feature comprises a first component extending vertically above the ground plane, and a second component extending horizontally from the first component to the first patch antenna; and the second sacrificial support feature comprises a third component extending vertically above the first component, and a fourth component extending horizontally from the third component to the second patch antenna.

Example 14. The method of any one of examples 1-13, wherein removing at least the section of the sacrificial support feature creates a void within the dielectric material, and wherein the method further comprises: further applying the dielectric material to fill at least a section of the void.

Example 15. The method of any one of examples 1-14, wherein removing at least the section of the sacrificial support feature comprises: machining or drilling away at least the section of the sacrificial support feature.

Example 16. The method of any one of examples 1-15, wherein the sacrificial support feature comprises a material that is compositionally different from materials of the ground plane and the patch antenna, and wherein removing at least the section of the sacrificial support feature comprises: dissolving at least the section of the sacrificial support feature using a solution that selectively dissolves the material of the sacrificial support feature.

Example 17. The method of any one of examples 1-16, wherein the ground plane comprises a first aperture slot and a second aperture slot that are non-intersecting and substantially symmetrical with each other about an imaginary plane of symmetry that divides the ground plane into two substantially symmetrical halves, the imaginary plane orthogonal to the ground plane.

Example 18. The method of any one of examples 1-17, wherein the patch antenna is a first lower patch antenna, wherein the sacrificial support feature is a first sacrificial support feature, and wherein the element further includes: a first upper patch antenna above the first lower patch antenna; a second sacrificial support feature to support the first upper patch antenna above the first lower patch antenna and the ground plane; a second lower patch antenna above the ground plane and laterally adjacent to the first lower patch antenna; a second upper patch antenna above the second lower patch antenna and laterally adjacent to the first upper patch antenna; a third sacrificial support feature to support the second lower patch antenna above the ground plane; and a fourth sacrificial support feature to support the second upper patch antenna above the second lower patch antenna and the ground plane.

Example 19. The method of example 18, wherein an upper surface of the first lower patch antenna and an upper surface of the second lower patch antenna are substantially coplanar, and wherein an upper surface of the first upper patch antenna and an upper surface of the second upper patch antenna are substantially coplanar.

Example 20. The method of any one of examples 18-19, wherein the first support feature and the third support feature have a common section that extends substantially orthogonally above from the ground plane.

Example 21. A method of manufacturing an antenna assembly, the method comprising: printing, using a three-dimensional printer, a continuous and monolithic element that includes (i) a conductive first layer comprising one or more slots therewithin, (ii) a conductive second layer above the first layer, and (iii) a support feature between the first layer and the second layer, wherein the support feature supports the second layer above the first layer; and applying a fill material to the continuous and monolithic element, such that the fill material at least in part extends from the first layer to the second layer.

Example 22. The method of example 21, wherein the fill material is an expanding foam.

Example 23. The method of example any one of examples 21-22, wherein the support feature comprises a conductive material, and wherein the method further comprises: subsequent to applying the fill material, removing at least a section of the conductive support feature.

Example 24. The method of any one of examples 21-23, wherein the support feature comprises non-conductive materials, and the support feature is not removed subsequent to applying the fill material.

Example 25. The method of any one of examples 21-24, wherein the support feature is a first support feature, and wherein the element further includes (i) a conductive third layer above the second layer, and (iii) a second support feature that supports the third layer above the second layer.

Example 26. The method of any one of examples 21-25, further comprising: attaching the first layer, with the fill material and the second layer there above, to a first surface of a third layer comprising dielectric material; wherein one or more conductive lines are attached to an opposing second surface of the third layer.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna system 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

a ground plane having a first aperture slot and a second aperture slot, wherein the first aperture slot and the second aperture slot are non-intersecting and substantially symmetrical with each other about an imaginary plane of symmetry that divides the ground plane into two substantially symmetrical halves, the imaginary plane orthogonal to the ground plane;

a first patch antenna above the ground plane, and a second patch antenna above the first patch antenna, wherein the first patch antenna is separated from the ground plane, and the second patch antenna is separated from the first patch antenna;

a first feed line at least in part below the first aperture slot, and a second feed line at least in part below the second aperture slot, wherein no portion of the first feed line is below the second aperture slot and no portion of the second feed line is below the first aperture slot, and wherein the first and second feed lines are symmetrical with each other about the imaginary plane;

wherein the first feed line comprises:

a first section that is below the first aperture slot;

a second section that is perpendicular to the first section and on a first side of the first section, at least a part of the second section is not below the first aperture slot; and a third section that is perpendicular to the first section and on a second side of the first section that is opposite the first side, wherein a first part of the third section is below the first aperture slot and a second part of the third section is not below the first aperture slot.

2. The antenna assembly of claim 1, wherein:

the first aperture slot has (i) a first side that faces a first side of the ground plane, and (ii) a second side that faces a second side of the ground plane, the first side of the first aperture slot is opposite the second side of the first aperture slot, and the first side of the ground plane is opposite the second side of the ground plane; and a length of the first side of the first aperture slot is greater than a length of the second side of the first aperture slot by at least 0.02λ, where λ is the signal wavelength.

3. The antenna assembly of claim 2, wherein:

the first aperture slot further has (i) a third side that faces a third side of the ground plane, and (ii) a fourth side that faces a fourth side of the ground plane, wherein the third side of the first aperture slot is substantially parallel to the third side of the ground plane, and wherein the fourth side of the first aperture slot is not parallel to the fourth side of the ground plane.

4. The antenna assembly of claim 3, wherein:

the first side of the aperture slot is substantially parallel to and at a first distance from the first side of the ground plane;

the third side of the aperture slot is substantially parallel to and at a second distance from the third side of the ground plane; and the first distance is greater than the second distance by at least 0.02λ, where λ is the signal wavelength.

5. The antenna assembly of claim 3, wherein the fourth side is non-linear.

6. The antenna assembly of claim 3, wherein an angle between the fourth side of the first aperture slot and the first side of the first aperture slot is less than 88 degrees, and an angle between the fourth side of the first aperture slot and the second side of the first aperture slot is more than 92 degrees.

7. The antenna assembly of claim 3, wherein:

the ground plane has an outer perimeter defined by a first corner, a second corner, a third corner that is opposite the first corner, and a fourth corner that opposite the second corner;

an internal corner of the ground plane defined by the first side and the fourth side of the first aperture slot is nearer to the first corner of the ground plane than it is to the second, third and fourth corners; and the imaginary plane passes through the first and third corners of the ground plane.

8. The antenna assembly of claim 1, wherein the imaginary plane divides each of the first patch antenna and the second patch antenna into corresponding substantially symmetrical halves.

9. The antenna assembly of claim 1, wherein:

the first patch antenna has a corresponding surface facing the ground plane;

the second patch antenna has a corresponding surface facing the first patch antenna;

the surface of the first patch antenna has a side having a first length;

the surface of the second patch antenna has a side having a second length; and the first length and the second length differ by at least 0.04λ, where λ is the signal wavelength.

10. The antenna assembly of claim 9, wherein the surface of the first patch antenna has one of a square shape, a rhombus shape, or a circular shape, and the surface of the second patch antenna has one of a square shape, a rhombus shape, or a circular shape.

11. The antenna assembly of claim 1, further comprising dielectric fill material between (i) the first and second feed lines and (ii) the ground plane.

12. The antenna assembly of claim 1, wherein a surface of the ground plane, which faces the first and second patch antennas, is substantially a square, with a side of the surface of the ground plane having a length that is at most 0.5λ, where λ is the signal wavelength.

13. The antenna assembly of claim 1, wherein the antenna assembly is configured to provide a bandwidth ratio of at least 2:1.

14. The antenna assembly of claim 1, wherein the first patch antenna is a first lower patch antenna, the second patch antenna is a first upper patch antenna, and wherein the antenna assembly further comprises:

a second lower patch antenna above the ground plane and coplanar with the first lower patch antenna; and a second upper patch antenna above the second lower patch antenna and coplanar with the first upper patch antenna;

wherein the first aperture slot and the second aperture slot of the ground plane are below the first lower patch antenna, and wherein the ground plane further comprises a third aperture slot and a fourth aperture slot that are below the second lower patch antenna.

15. An antenna assembly comprising:

a first feed line and a second feed line that are symmetrical with each other about an imaginary plane of symmetry;

a ground plane having (i) a first aperture slot that is above at least a part of the first feed line and (ii) a second aperture slot that is above at least a part of the second feed line, wherein the first aperture slot and the second aperture slot are non-intersecting;

one or more patch antennas above the ground plane and separated from the ground plane;

wherein:

the first aperture slot has (i) a first side that faces a first side of the ground plane, and (ii) a second side that faces a second side of the ground plane, the first side of the first aperture slot is opposite the second side of the first aperture slot, and the first side of the ground plane is opposite the second side of the ground plane;

a length of the first side of the first aperture slot is greater than a length of the second side of the first aperture slot by at least 0.02λ, where λ is the signal wavelength the first aperture slot further has (i) a third side that faces a third side of the ground plane, and (ii) a fourth side that faces a fourth side of the ground plane, the third side of the first aperture slot is substantially parallel to the third side of the ground plane, and wherein the fourth side of the first aperture slot is not parallel to the fourth side of the ground plane;

the first side of the aperture slot is substantially parallel to and at a first distance from the first side of the ground plane;

the third side of the aperture slot is substantially parallel to and at a second distance from the third side of the ground plane; and the first distance is greater than the second distance by at least 0.02λ, where λ is the signal wavelength.

16. The antenna assembly of claim 15, wherein the one or more patch antennas comprise:

a first patch antenna above the ground plane; and a second patch antenna above the first patch antenna, wherein the first patch antenna and the second patch antenna have the same shape but different sizes, wherein the plane of symmetry is orthogonal to the ground plane, and wherein the first aperture slot and the second aperture slot are symmetrical with each other about the plane of symmetry.

17. An antenna array comprising a plurality of antenna structures, the antenna array comprising:

a ground plane common to the plurality of antenna structures, the ground plane having, for each antenna structure of the plurality of antenna structures, a corresponding first aperture slot and a corresponding second aperture slot that are non-intersection and symmetrical to each other about a corresponding plane of symmetry, such that the ground plane comprises a plurality of first aperture slots and plurality of second aperture slots;

wherein each antenna structure of the plurality of antenna structures comprises (i) a corresponding lower patch antenna that is above the corresponding first and second aperture slots of the ground plane, and (ii) an upper patch antenna above the lower patch antenna, such that the antenna array comprises a plurality of lower patch antennas and a plurality of upper patch antennas;

a first feed line at least in part below the first aperture slot, and a second feed line at least in part below the second aperture slot, wherein no portion of the first feed line is below the second aperture slot and no portion of the second feed line is below the first aperture slot, and wherein the first and second feed lines are symmetrical with each other about the imaginary plane;

wherein the first feed line comprises:

a first section that is below the first aperture slot;

a second section that is perpendicular to the first section and on a first side of the first section, at least a part of the second section is not below the first aperture slot; and a third section that is perpendicular to the first section and on a second side of the first section that is opposite the first side, wherein a first part of the third section is below the first aperture slot and a second part of the third section is not below the first aperture slot.

* * * * *